(12) United States Patent
Ago et al.

(10) Patent No.: US 8,697,230 B2
(45) Date of Patent: Apr. 15, 2014

(54) GRAPHENE SHEET AND METHOD FOR PRODUCING THE SAME

(75) Inventors: Hiroki Ago, Fukuoka (JP); Yoshito Ito, Fukuoka (JP); Izumi Tanaka, Fukuoka (JP); Seigi Mizuno, Fukuoka (JP); Masaharu Tsuji, Fukuoka (JP)

(73) Assignee: Kyushu University, Fukuoka (JP)

( * ) Notice: Subject to any disclaimer, the term of this patent is extended or adjusted under 35 U.S.C. 154(b) by 0 days.

(21) Appl. No.: 13/393,249

(22) PCT Filed: Aug. 31, 2010

(86) PCT No.: PCT/JP2010/064848
§ 371 (c)(1),
(2), (4) Date: Apr. 16, 2012

(87) PCT Pub. No.: WO2011/025045
PCT Pub. Date: Mar. 3, 2011

(65) Prior Publication Data
US 2012/0196074 A1    Aug. 2, 2012

(30) Foreign Application Priority Data

Aug. 31, 2009 (JP) ................................. 2009-200982
Mar. 2, 2010 (JP) ................................. 2010-045930

(51) Int. Cl.
*B32B 15/04* (2006.01)
*C01B 31/00* (2006.01)
(52) U.S. Cl.
USPC ......... 428/220; 428/332; 423/448; 427/374.1
(58) Field of Classification Search
USPC ................. 428/220, 332; 427/374.1; 423/448
See application file for complete search history.

(56) References Cited

U.S. PATENT DOCUMENTS

| 2009/0155561 A1 | 6/2009 | Choi et al. |
| 2010/0021708 A1* | 1/2010 | Kong et al. .................. 428/220 |
| 2010/0038629 A1 | 2/2010 | Lazarev |

FOREIGN PATENT DOCUMENTS

| JP | 2009-143799 | 7/2009 |
| WO | 2008/056126 | 5/2008 |

OTHER PUBLICATIONS

International Search Report issued Nov. 30, 2010 in International (PCT) Application No. PCT/JP2010/064848, of which the present application is the national stage.

(Continued)

*Primary Examiner* — Elizabeth Mulvaney
(74) *Attorney, Agent, or Firm* — Wenderoth, Lind & Ponack, L.L.P.

(57) ABSTRACT

To provide a graphene sheet that has a large area, is homogeneous, and has a small amount of domain boundaries, a novel method for producing a graphene sheet suitable for industrial applications, such as application to electronics, that is capable of producing a graphene sheet that has well aligned crystal orientation at a low cost, and a graphene sheet.

In the method for producing a graphene sheet of the present invention, a substrate containing a single crystal substrate having formed on the surface thereof an epitaxial metal film is used, and a graphene sheet is grown by making a carbon material into contact with the surface of the epitaxial metal film. In the graphene sheet of the present invention, the graphene sheet is constituted by a number of graphene domains, the domains each have an area of from 0.000001 $\mu m^2$ to 100,000 $mm^2$, and the orientations of 6-membered rings in the domains are averagely aligned in a single direction over the graphene sheet.

25 Claims, 43 Drawing Sheets

(56) References Cited

OTHER PUBLICATIONS

A. Obraztsov et al., "Chemical vapor deposition of thin graphite films of nanometer thickness", Carbon, vol. 5, Sep. 2007, pp. 2017-2021.

D. Usachov et al., "Experimental and theoretical study of the morphology of commensurate and incommensurate graphene layers on Ni single-crystal surfaces", Physical Review, vol. 78, No. 8, Aug. 2008, pp. 085403-1-085403-8.

Z. Juang et al., "Synthesis of graphene on silicon carbide substrates at low temperature", Carbon, vol. 47, No. 8, Jul. 2009, pp. 2026-2031.

* cited by examiner hydrogen annealing time: 120 minutes

5(a)  5(b)

6(a)　　　　　　　　　　　　　　　　　　　6(b)

Fig. 9
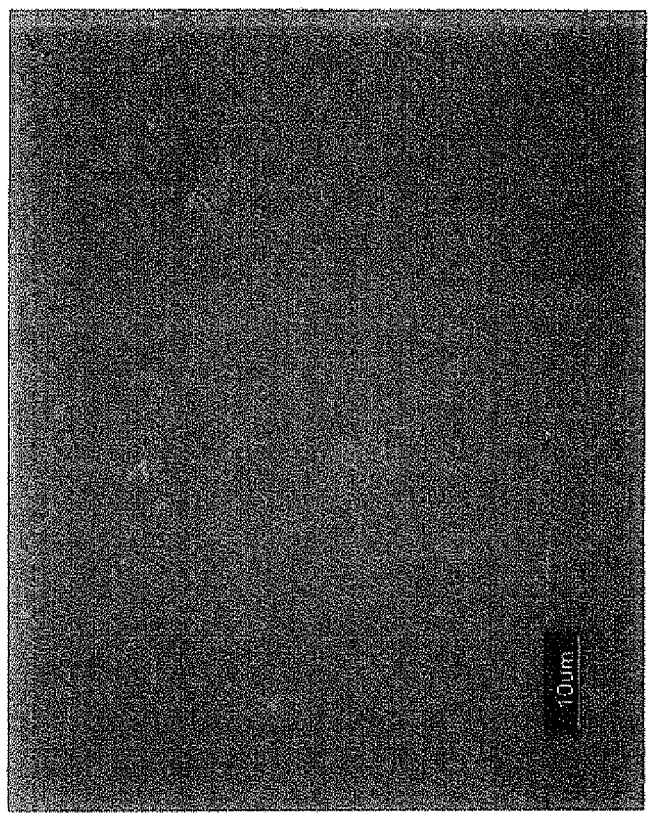
(b)
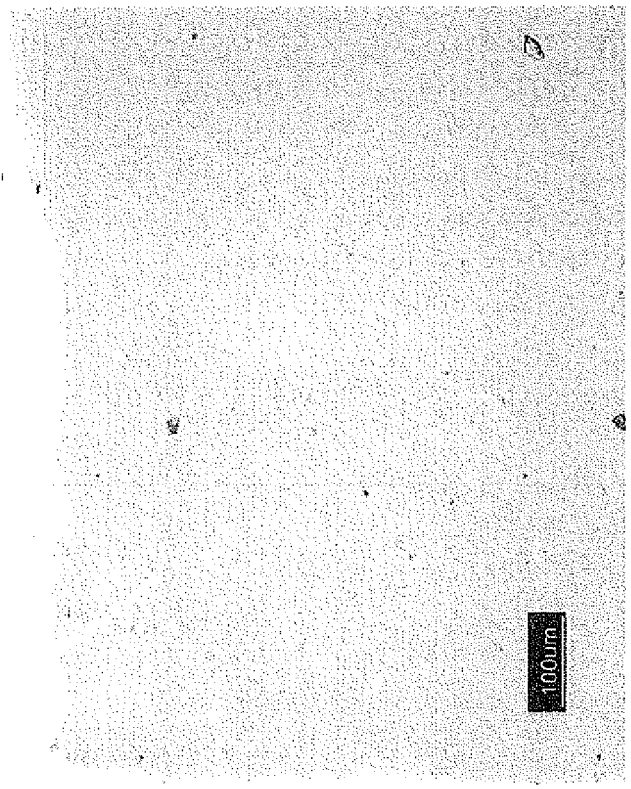
(a)

Fig. 12
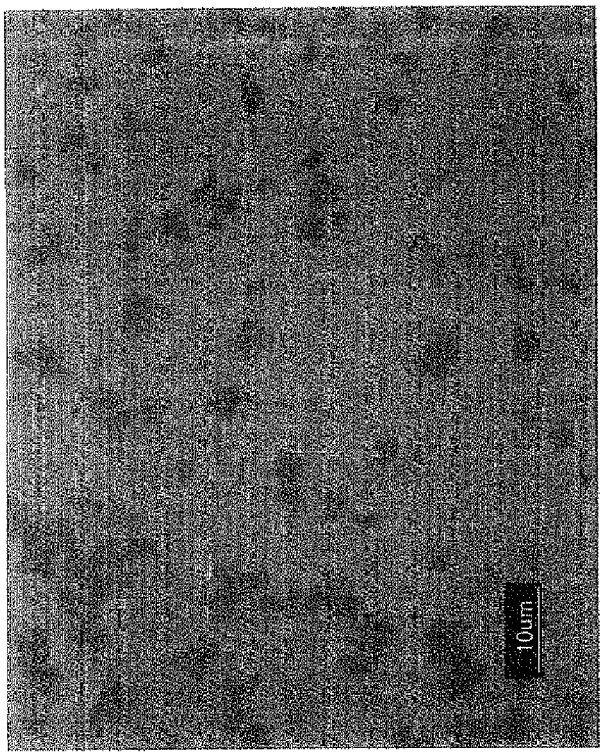
(b)
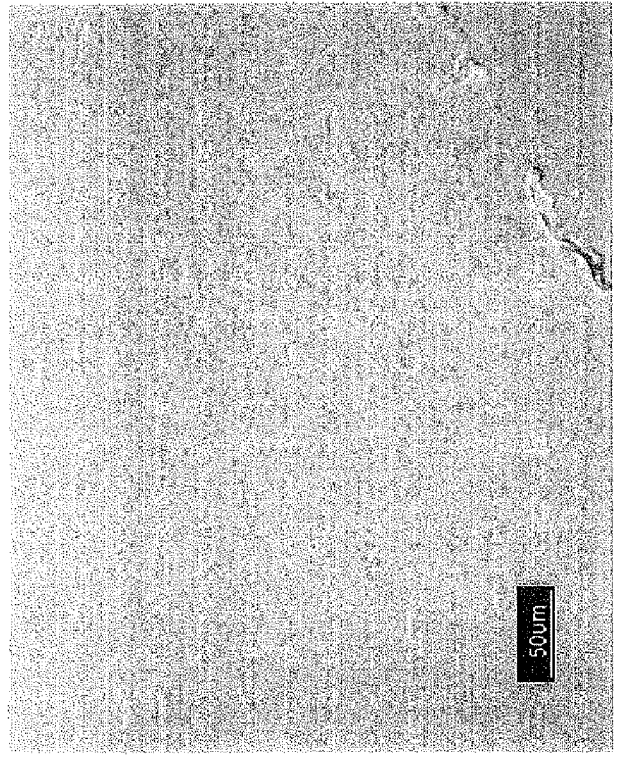
(a)

Fig. 15
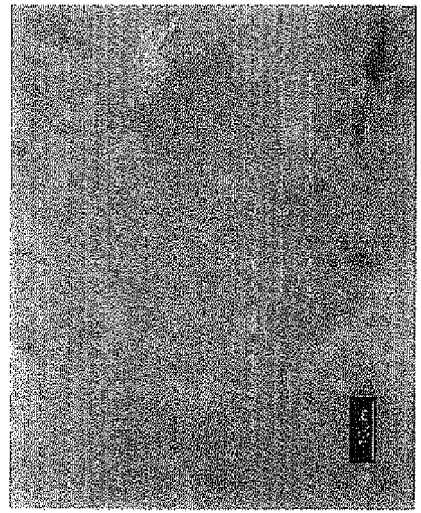
(b)
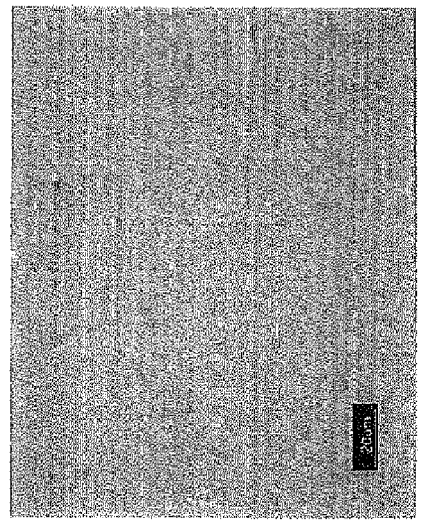
(d)
Co catalyst
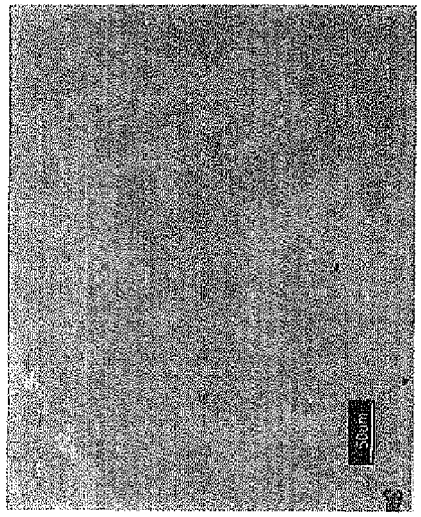
(a)
Ni catalyst
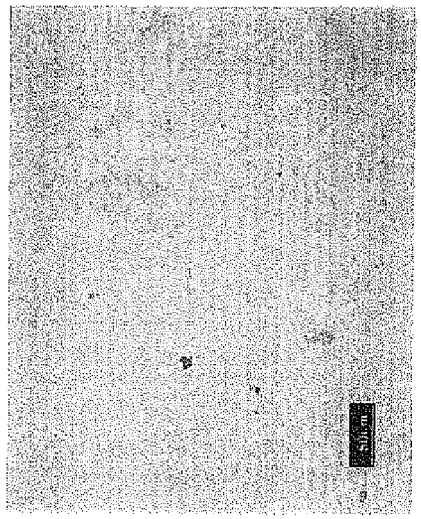
(c)

Fig.17
Co catalyst
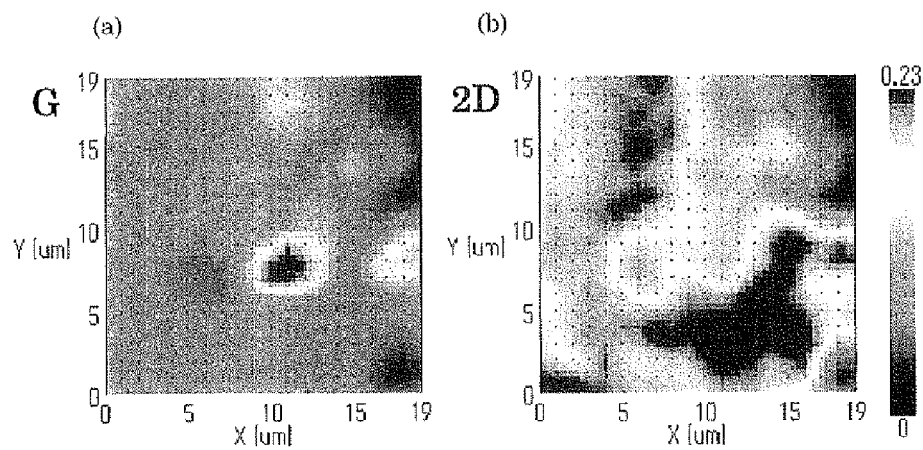
Ni catalyst
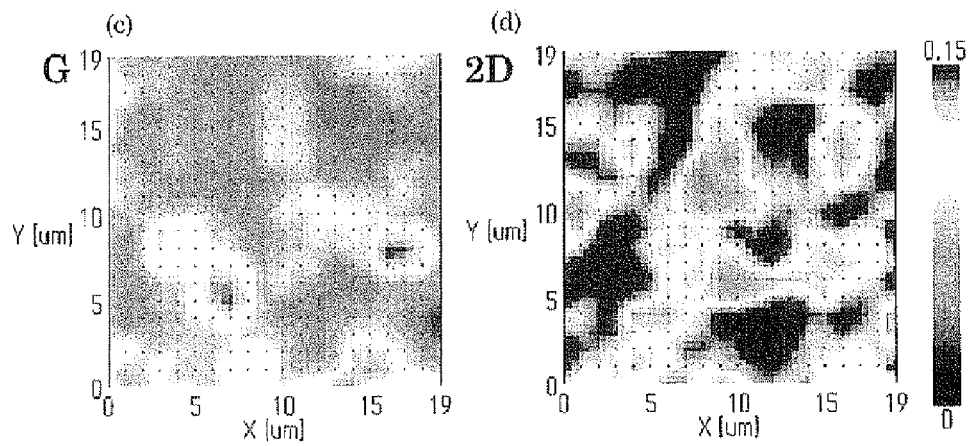

Fig. 21
Co catalyst
(a)
(b)
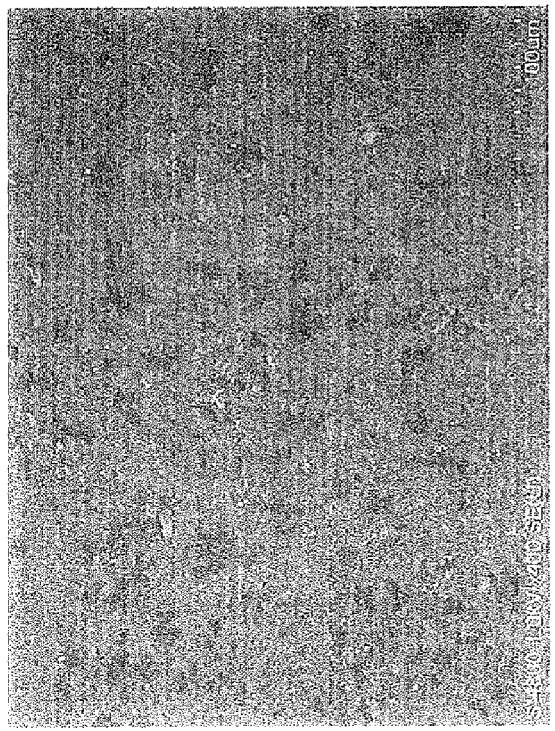

Fig.22
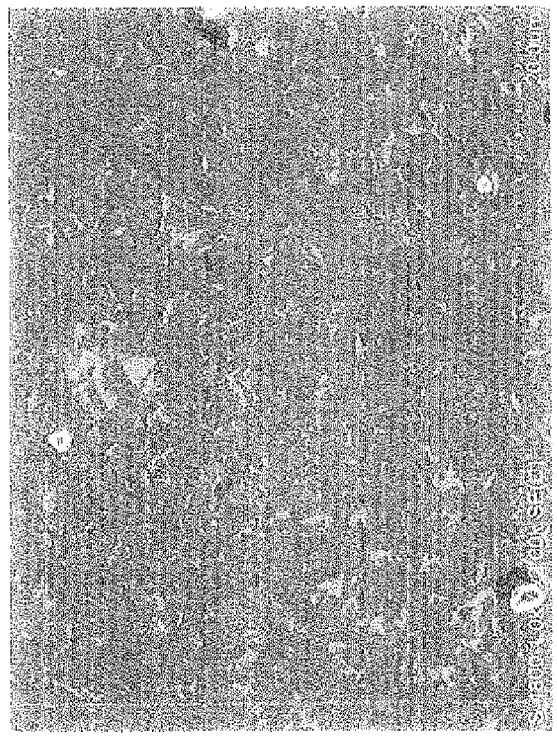
(b)
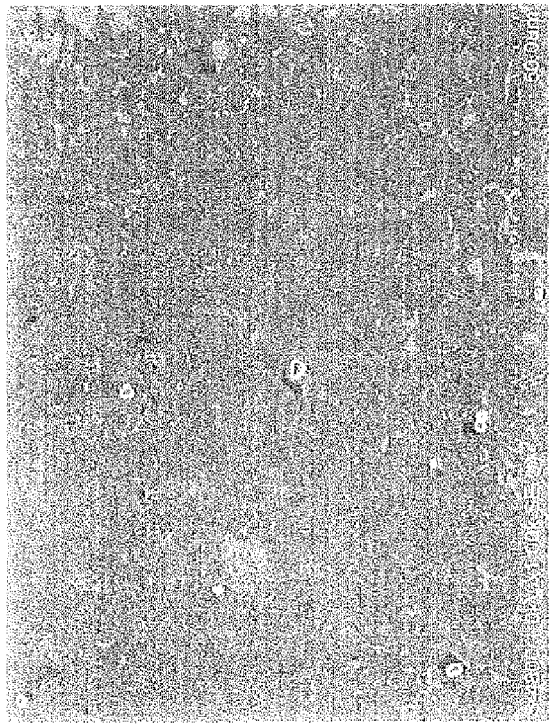
Ni catalyst
(a)

Fig.31
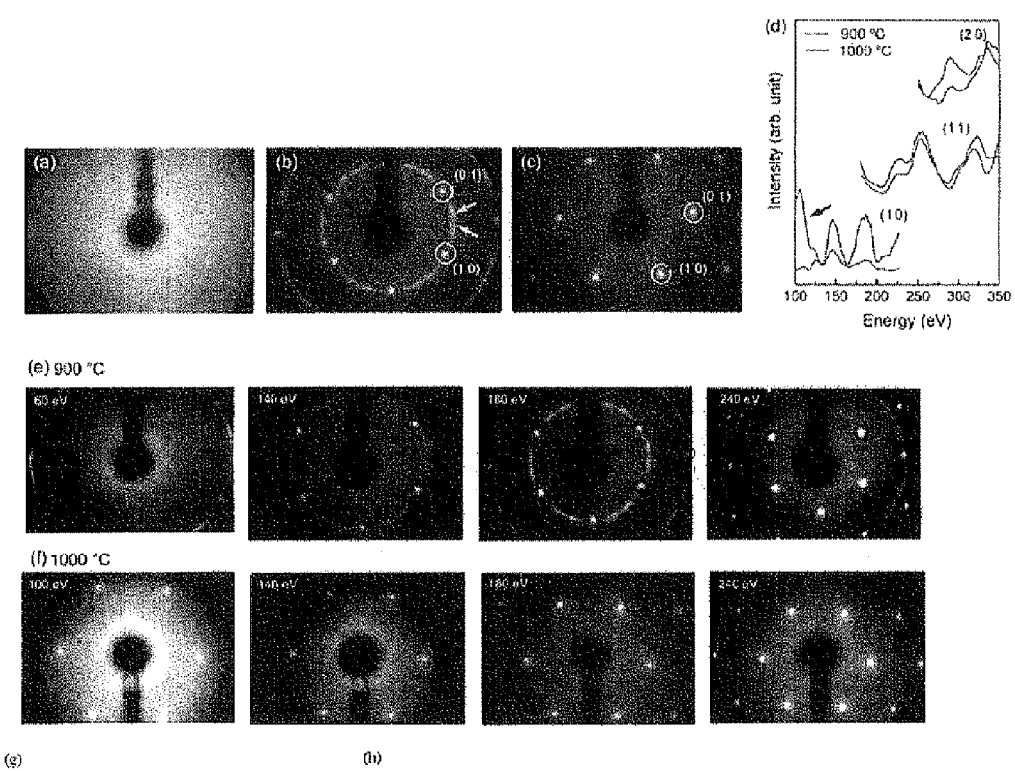
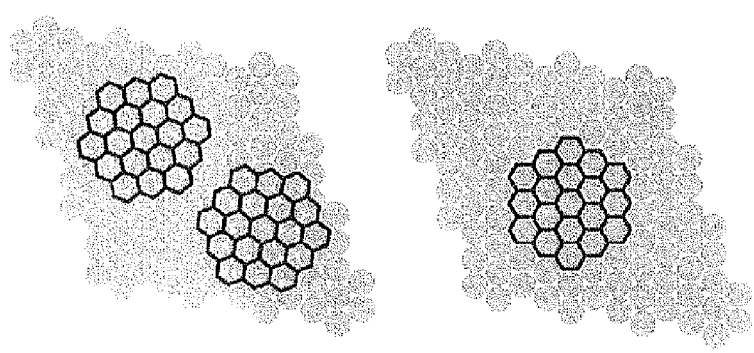

Fig.33
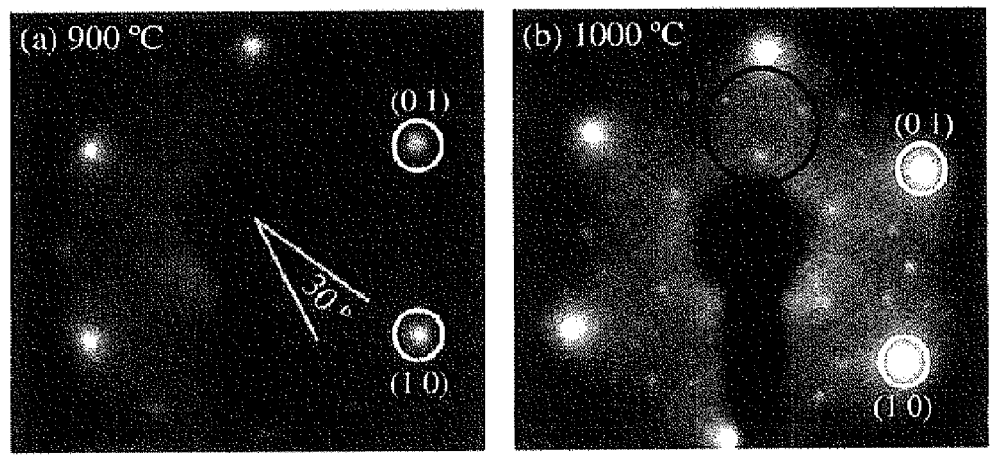
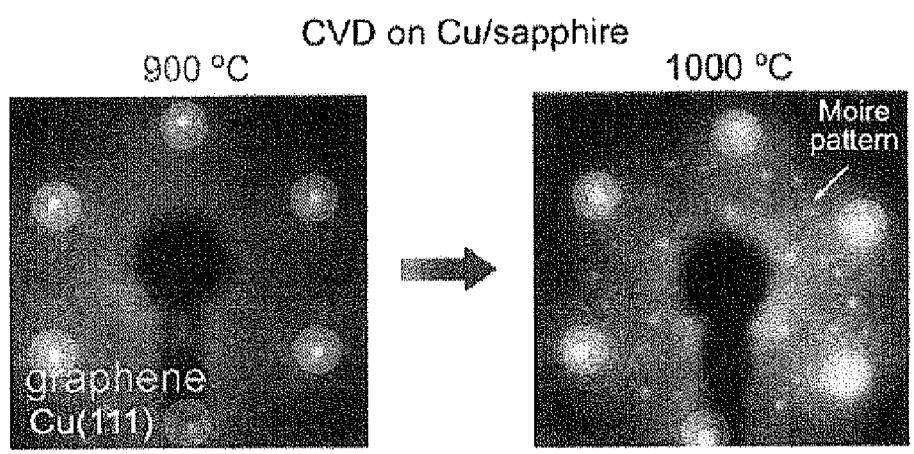

Fig.36
(a)
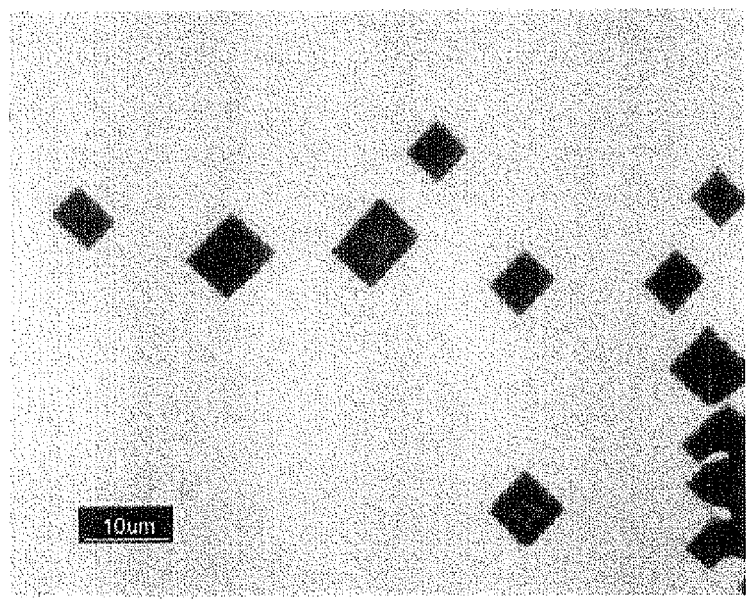
(b)
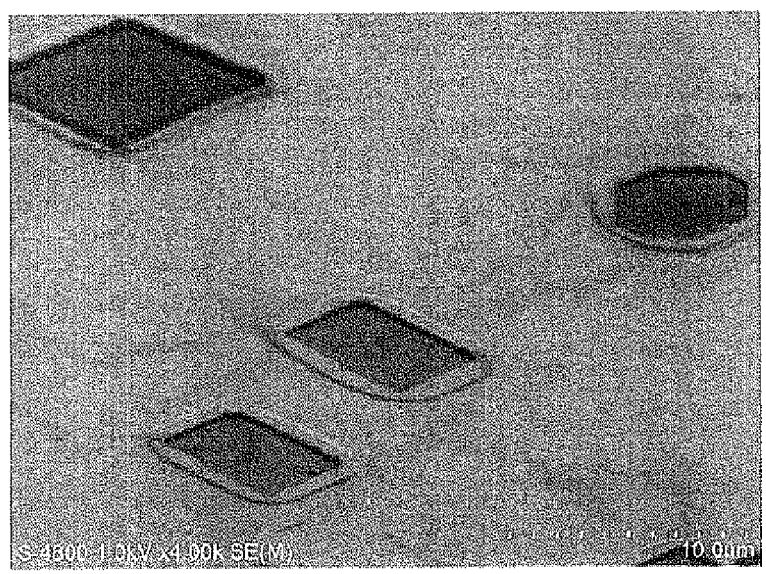

Fig.37
(a)
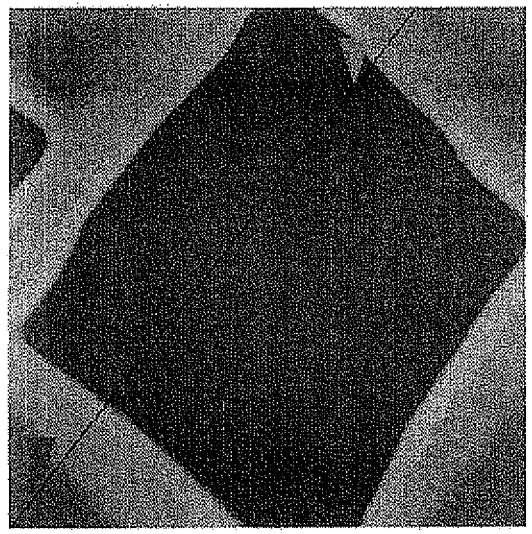
(b)
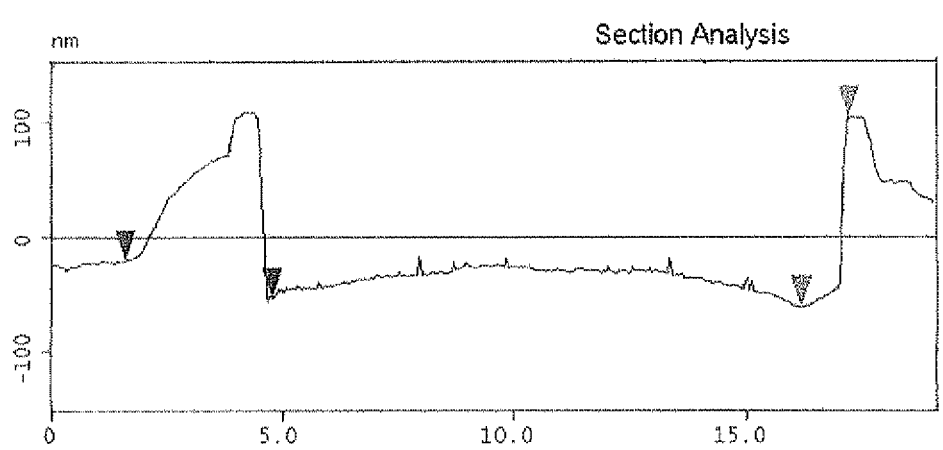

Crystal orientation distribution map (Co)

Fig.39
(a)
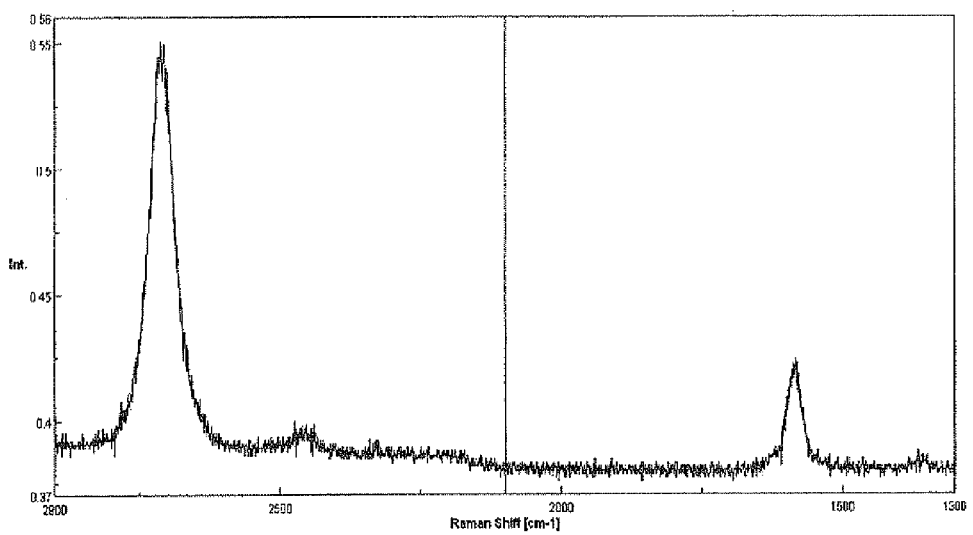
(b)
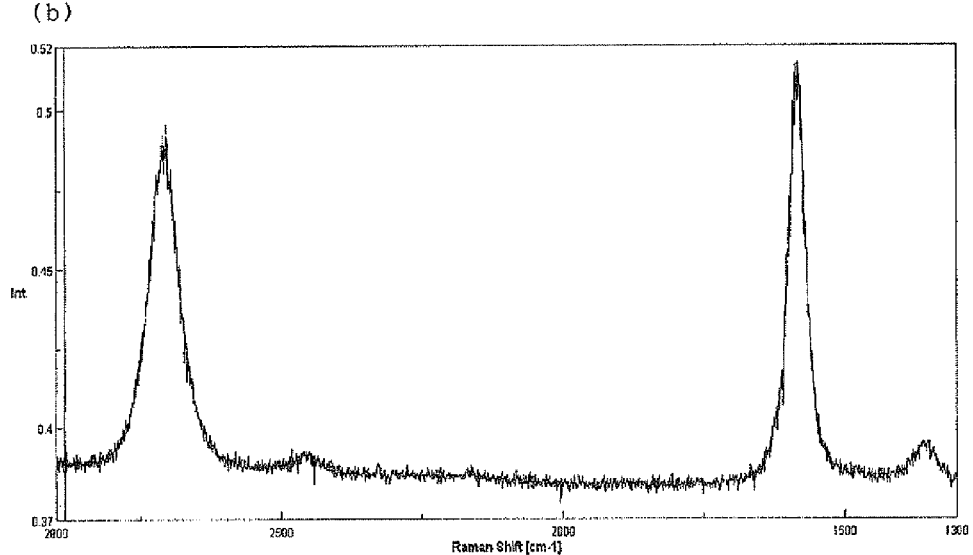

Fig.40
(a) 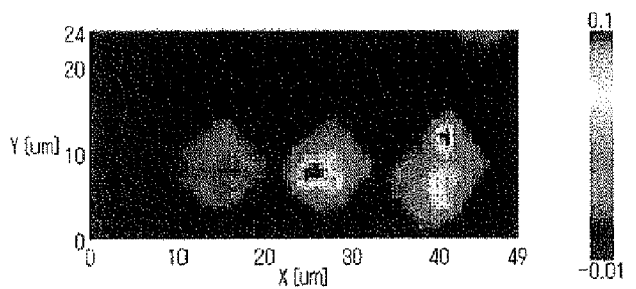
(b) 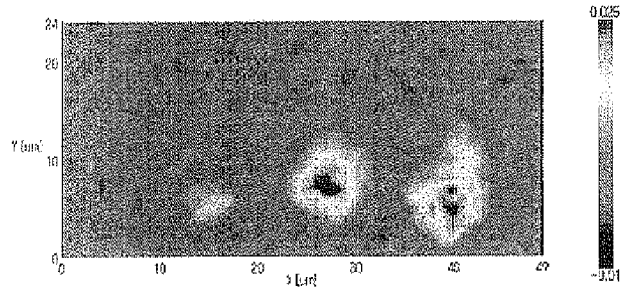
(c) 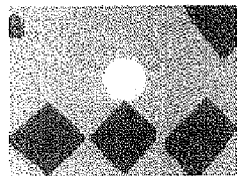
(d) 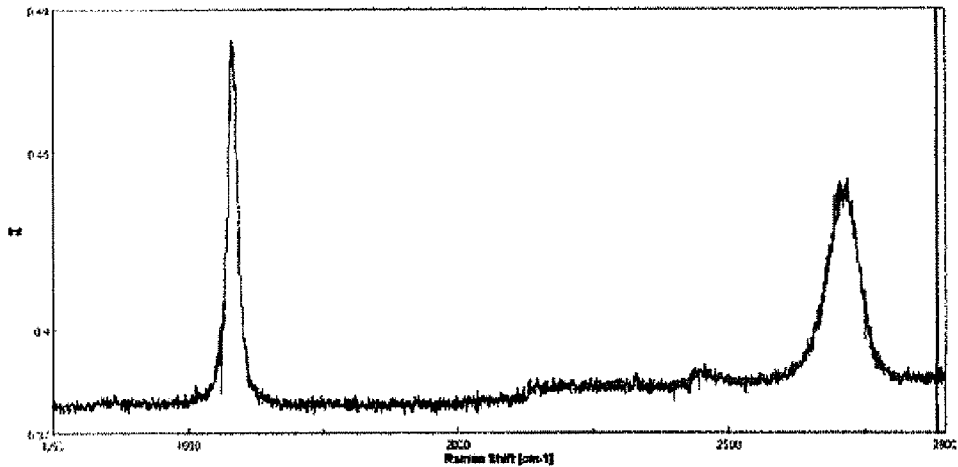

Fig.41
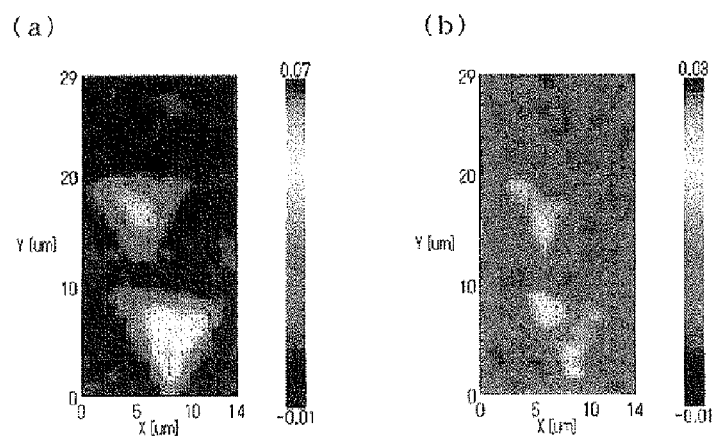
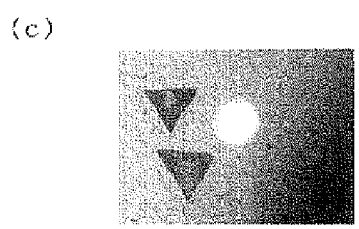
Fig.42
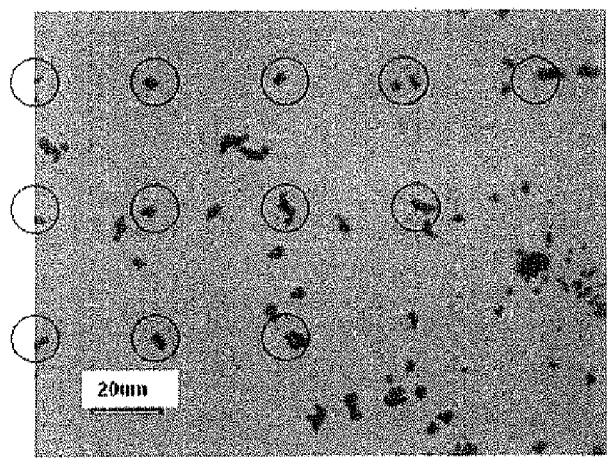

Fig.45
(a)
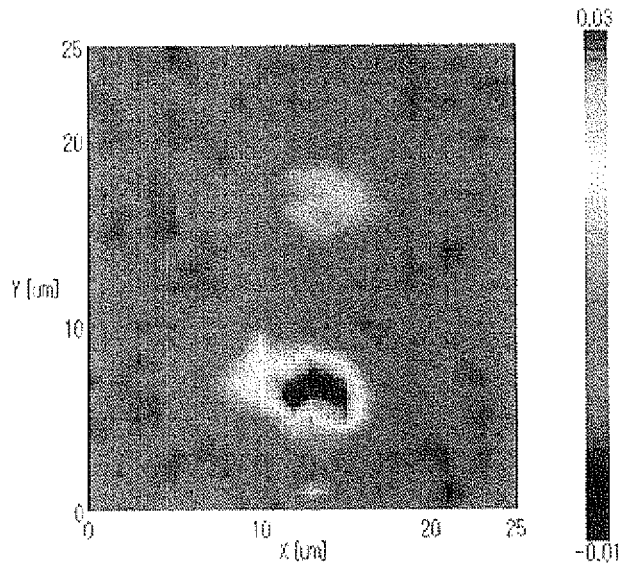
(b)
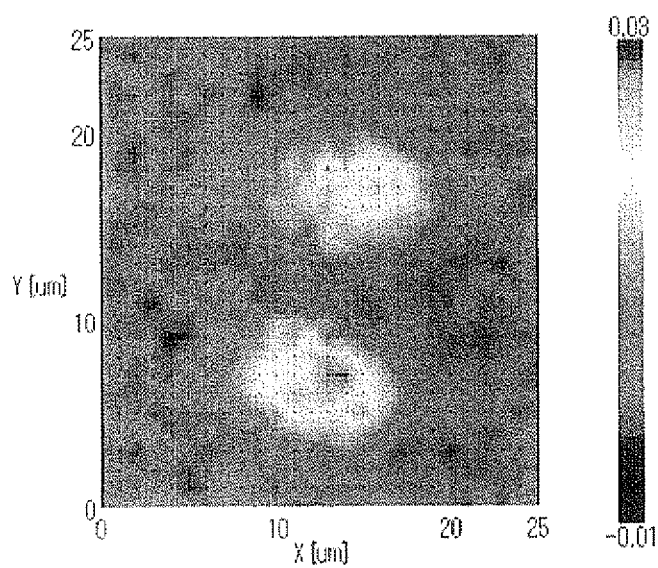

Fig.49
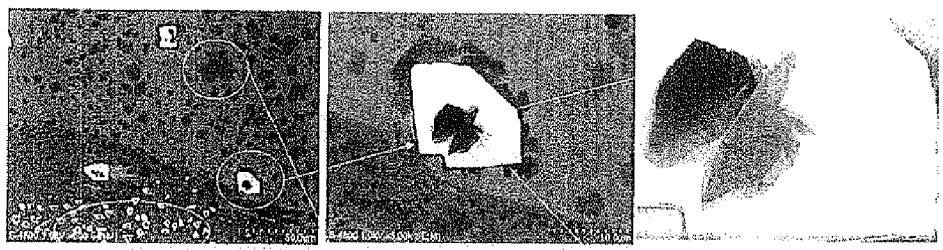
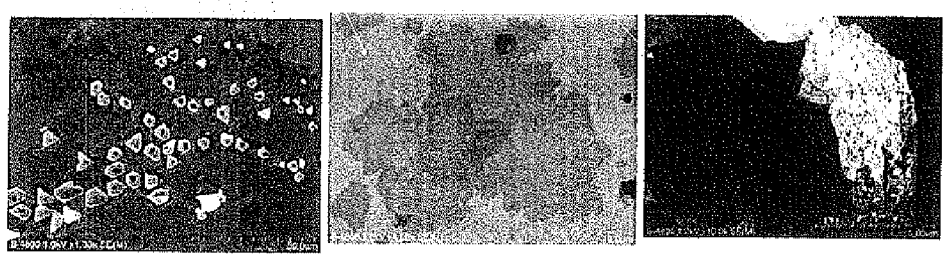
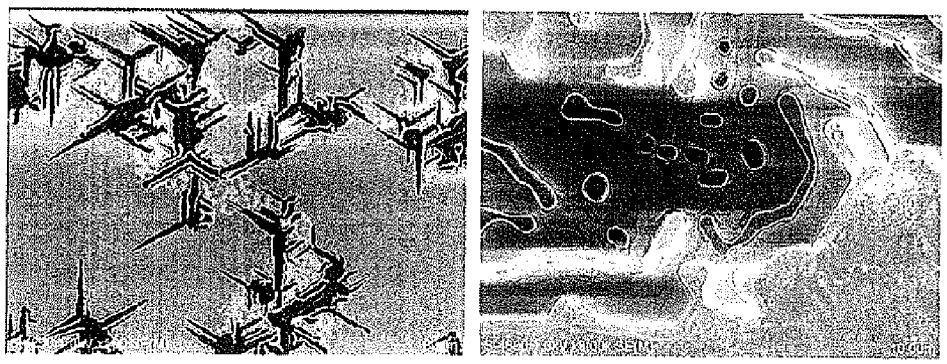

GRAPHENE SHEET AND METHOD FOR PRODUCING THE SAME

TECHNICAL FIELD

The present invention relates to a graphene sheet and a method for producing the same, and more specifically a graphene sheet and a method for producing the same using a metal film as a catalyst.

BACKGROUND ART

Graphene is a single sheet or plural sheets taken out from graphite, and has an ideal two-dimensional structure constituted by $sp^2$ carbon. Graphene is referred to as single layer graphene, two-layer graphene, multi-layer graphene, and the like, depending on the number of layers.

Graphene has been reported to have a considerably high mobility of electrons and holes (from 10,000 to 200,000 $cm^2/Vs$), and the mobility exceeds silicon, GaAs and the like. Graphene is in the form of a two-dimensional sheet and thus can be applied with production techniques for semiconductors, such as lithography and etching, thereby providing various structures. Furthermore, graphene has excellent transparency and mechanical flexibility, and possibly has applications to various devices including a flexible transistor and a transparent electrode.

For providing a graphene sheet, a method of mechanically exfoliated from graphite, such as HOPG, with a Scotch adhesive tape has been practiced, but resulting graphene sheets are fluctuated in size and thickness, and cannot be subjected to practical applications.

As an alternative method therefor, formation of a graphene sheet by thermal decomposition of SiC, carbonization reaction on a single metal crystal in high vacuum, and the like have been reported. However, there are problems that the SiC single crystal substrate and an Ni (111) single crystal substrate used in these methods are expensive, and are available only in a limited size.

Under the circumstances, as a method of synthesizing graphene with a large area at low cost, a technique of performing carbonization reaction on a transition metal film by a chemical vapor deposition (CVD) method is proposed in recent years (see Non-patent Documents 1 to 3 and Patent Documents 1 and 2).

RELATED ART DOCUMENTS

Non-Patent Documents

[Non-patent Document 1] Nano Letters, vol. 9, p. 30 (2009)
[Non-patent Document 2] Nature, vol. 457, p. 706 (2009)
[Non-patent Document 3] Science, vol. 324, p. 1312 (2009)

Patent Documents

[Patent Document 1] JP-A-2009-143799
[Patent Document 2] JP-A-2009-107921

DISCLOSURE OF THE INVENTION

Problems to be Solved by the Invention

However, the catalyst metal used in the ordinary CVD method is a polycrystalline material, such as a thin film like a metal foil, or a thin film produced by sputtering or electron beam vapor deposition, and has only a small crystalline size. Accordingly, the graphene deposited and formed on the catalyst has a small crystal size, and is considered that the directions of the 6-membered rings (i.e., the directions of graphene lattices) are random with respect to each of the crystal domains.

It is considered that graphene is deposited and formed from crystal boundaries and defects of the catalyst metal, and thus graphene is formed from many sites on a polycrystalline catalyst. As a result, a graphene sheet that has small domains, uneven thickness and random domain directions is formed.

Graphene that is synthesized by a CVD method has a large number of domain boundaries. Due to the presence of the domain boundaries, graphene that is synthesized by a CVD method fails to have such a high mobility that is equivalent to graphene produced by exfoliation of graphite. Accordingly, there is a demand of technique of producing graphene with reduced domain boundaries and directions of graphene lattices aligned uniformly. Furthermore, it is also demanded to form graphene with a uniform number of layers.

The present invention has been developed in view of the circumstances, and an object thereof is to provide a graphene sheet that has a large area, is homogeneous, and has a small amount of domain boundaries, a novel method for producing a graphene sheet suitable for industrial applications, such as application to electronics, that is capable of producing a graphene sheet having well aligned crystal orientation at a low cost.

Means for Solving the Problems

In the graphene sheet of the invention, the graphene sheet contains a large number of graphene domains, the domains each having an area of from 0.000001 $\mu m^2$ to 100,000 $mm^2$, orientations of 6-membered rings in the domains being averagely aligned in a single direction over the graphene sheet.

In a preferred embodiment of the graphene sheet, an in-plane shear of the orientation of 6-membered rings is such that 90% or more of the domains have orientations aligned within ±10° or less, and preferably ±5° or less.

In a preferred embodiment of the graphene sheet, the graphene sheet containing domains has an overall size of from 1 $mm^2$ to 50,000 $mm^2$.

In a preferred embodiment of the graphene sheet, the graphene sheet contains single layer graphene, two-layer graphene or three-layer graphene in a proportion of 50% or more. Particularly, in a preferred embodiment, the proportion of graphene that has the same number of layers is 90% or more, and particularly the proportion of single layer graphene is 90% or more.

A composite of a graphene sheet of the invention contains the graphene sheet that is transferred to a substrate, and has a size of from 10 $nm^2$ to 1 $m^2$.

A composite of a graphene sheet of the invention contains a metal film, and the graphene sheet that is grown on a surface of the metal film. A composite of a graphene sheet of the invention contains a single crystal substrate, an epitaxial metal film that is formed on the single crystal substrate, and the graphene sheet that is grown on a surface of the metal film. In the composites of a graphene sheet, it is preferred that a LEED (low energy electron diffraction) image of the composite containing the graphene sheet has six equally spaced diffraction spots, or has six equally spaced diffraction spots and a ring diffraction pattern having intensity distributed around the center of the six spots, or a LEED image of the composite containing the graphene sheet has a ring diffraction pattern that is locally distributed to twelve spots.

A graphene sheet of the invention is obtained by growing in a pit formed on a surface of an epitaxial metal film. A composite of a graphene sheet of the invention contains a metal film, and the graphene sheet that is grown in a pit formed on a surface of the metal film. A composite of a graphene sheet of the invention contains a single crystal substrate, an epitaxial metal film that is formed on the single crystal substrate, and the graphene sheet that is grown in a pit formed on a surface of the metal film.

A graphene sheet of the invention has a triangular, rectangular, hexagonal, octagonal or circular planar shape having an area of from 0.0001 to 1,000,000 $\mu m^2$, and has a thickness of from 1 to 20 layers. A graphene sheet of the invention has a planar shape having an edge with a zigzag structure or an armchair structure having an area of from 0.0001 to 1,000,000 $\mu m^2$, and has a thickness of from 1 to 20 layers. A composite of a graphene sheet of the invention contains the graphene sheet that is transferred to a substrate.

A method for producing a graphene sheet of the invention contains a step of growing a graphene sheet by making a carbon material into contact with a surface of an epitaxial metal film that is formed on a surface of a single crystal substrate.

In a preferred embodiment of the method for producing a graphene sheet, the graphene sheet is grown on 50% or more, preferably 80% or more, and more preferably the entire surface of the epitaxial metal film that is made in contact with the carbon material.

In a preferred embodiment of the method for producing a graphene sheet, the graphene sheet is grown on 50% or more, and preferably 80% or more, of the epitaxial metal film that is made in contact with the carbon material.

In a preferred embodiment of the method for producing a graphene sheet, the graphene sheet grown has a proportion of graphene that has the same number of layers of 50% or more, preferably 70% or more, and more preferably 90% or more. The graphene that has the same number of layers is preferably any one selected from single layer graphene, two-layer graphene and three-layer graphene.

In a preferred embodiment of the method for producing a graphene sheet, orientations of 6-membered rings in domains constituting the graphene sheet grown are averagely aligned in a single direction over the graphene sheet. It is particularly preferred that a LEED image of the graphene sheet and a composite containing the metal film have six equally spaced diffraction spots, or has the spots and a ring diffraction pattern having intensity that is locally distributed around the spots as centers, or the spots and a ring diffraction pattern that is locally distributed to twelve spots.

In a preferred embodiment of the method for producing a graphene sheet, the graphene sheet has an average domain size of 0.0001 $\mu m^2$ or more.

In a preferred embodiment of the method for producing a graphene sheet, the single crystal substrate is a single crystal made of $\alpha$-$Al_2O_3$, MgO or quartz ($SiO_2$). The epitaxial metal film is preferably a film of at least one species selected from Co, Ni, Fe, Cu, Pt, Pd, Ru, Au, Ir, Ti, Al, Ag, Mg, Mn, Cr and Sn.

In a preferred embodiment of the method for producing a graphene sheet, the graphene sheet is preferably grown on the epitaxial metal film by chemical vapor deposition (CVD) under a pressure of from the atmospheric pressure to a reduced pressure by feeding carbon-containing molecules in a gaseous state. In this case, the substrate is preferably subjected to hydrogen annealing at a temperature lower than a temperature upon synthesis of the graphene sheet, before synthesis of the graphene sheet.

In a preferred embodiment of the method for producing a graphene sheet, an organic polymer film is formed on the surface of the epitaxial metal film, and then the organic polymer is thermally decomposed in vacuum, thereby growing the graphene sheet.

In a preferred embodiment of the method for producing a graphene sheet, the graphene sheet is grown on the surface of the epitaxial metal film, and then the graphene sheet is separated therefrom by an acid treatment or a method utilizing a difference in reduction potential of transition metals.

In a preferred embodiment of the method for producing a graphene sheet, the graphene sheet is grown dominantly in a pit formed on a surface of the epitaxial metal film.

Advantages of the Invention

According to the invention, by using a relatively inexpensive single crystal substrate, such as sapphire ($\alpha$-$Al_2O_3$), MgO or quartz, a metal film raw material is sputtered on the single crystal substrate at a high temperature, thereby growing epitaxially a metal film from the surface of the single crystal substrate, and by using the substrate having the epitaxial metal film formed thereon, a carbon material is reacted by making in contact with the surface of the metal film. Consequently, a graphene sheet that has a large area, is homogeneous, and has a small amount of domain boundaries, in which graphene is grown epitaxially reflecting the property of the epitaxial film, and a graphene sheet that has well aligned crystal orientation can be provided.

According to the invention, graphene that has a high mobility and high quality can be provided at a low cost, and thus a novel graphene sheet that is suitable for industrial applications, such as application to electronics, is provided.

BRIEF DESCRIPTION OF DRAWINGS

FIGS. 9(a) and (b) show optical micrographs of graphene that is synthesized with Co/c-plane sapphire and transferred to a silicon substrate ((a) hydrogen annealing time: 180 minutes, low magnification, (b) hydrogen annealing time: 180 minutes, high magnification).

FIGS. 12(a) and (b) show optical micrographs of graphene that is synthesized with Ni/c-plane sapphire and transferred to a silicon substrate ((a) hydrogen annealing time: 180 minutes, low magnification, (b) hydrogen annealing time: 180 minutes, high magnification).

FIGS. 15(a) to (d) show optical micrographs of graphene that is synthesized with CH$_4$=3 vol % (H$_2$: 450 sccm, CH$_4$: 15 sccm) and transferred to a silicon substrate ((a) Co catalyst, low magnification, (b) Co catalyst, high magnification, (c) Ni catalyst, low magnification, (d) Ni catalyst, high magnification).

FIGS. 17(a) to (d) show Raman mapping results of graphene that is synthesized with CH$_4$=3 vol % (H$_2$: 450 sccm, CH$_4$: 15 sccm) and transferred to a silicon substrate ((a) Co catalyst, G band, (b) Co catalyst, 2D band, (c) Ni catalyst, G band, (d) Ni catalyst, 2D band).

FIGS. 21(a) and (b) show SEM images of graphene that is synthesized with Co/c-plane sapphire ((a) low magnification, (b) high magnification).

FIGS. 22(a) and (b) show SEM images of graphene that is synthesized with Ni/c-plane sapphire ((a) low magnification, (b) high magnification).

FIG. 31(a) shows a LEED image of Co/c-plane sapphire (beam energy: 180 eV), FIGS. 31(b) and (c) show LEED images of graphene/Co/c-plane sapphire ((b): grown at 900° C., (c): grown at 1,000° C., beam energy: 180 eV), FIG. 31(d) shows comparison of change in intensity of (10), (11) and (12) diffraction spots of samples grown at 900° C. and 1,000° C., FIGS. 31(e) and (f) show LEED images measured for samples grown at 900° C. (e) and 1,000° C. (f) with the beam energy changed, and FIGS. 31(g) and (h) show relative orientation relationship of Co atom and graphene, which is derived from the LEED patterns.

FIGS. 33(a) and (b) show LEED images of graphene/Cu/c-plane sapphire ((a): grown at 900° C., (b): grown at 1,000° C., beam energy: 140 eV). The area surrounded by the circle in FIG. 33(a) is a diffraction spot of the Cu lattice. The area surrounded by the circle in FIG. 33(b) is a diffraction spot of both the Cu lattice and the graphene. FIG. 33(c) is an illustration describing the LEED images.

FIG. 36(a) shows an optical micrograph of pits formed on a surface of a Co film having polystyrene coated thereon, and FIG. 36(b) shows an SEM image thereof.

FIG. 37(a) shows an AFM image of pits formed on a surface of a Co film, and FIG. 37(b) shows a height profile thereof.

FIG. 39(a) shows a Raman spectrum of single layer graphene, and FIG. 39(b) shows a Raman spectrum of two-layer or multi-layer graphene.

FIGS. 40(a) and (b) show a Raman mapping result of graphene formed in pits, in which FIG. 40(a) shows the intensity distribution of the G band, and FIG. 40(b) shows the intensity distribution of the 2D band. FIG. 40(c) shows an optical micrograph of the corresponding view field, and FIG. 40(d) shows a representative Raman spectrum.

FIGS. 41(a) and (b) show a Raman mapping result of rectangular pits formed on a Co/MgO(111) substrate, in which FIG. 41(a) shows the intensity distribution of the G band, and FIG. 41(b) shows the intensity distribution of the 2D band. FIG. 41(c) shows an optical micrograph of the corresponding view field.

FIG. 42 shows an optical micrograph showing an example where pits are formed at designated positions by electron beam lithography and chemical etching. The positions surrounded by the circles are patterned positions.

FIGS. 45(a) and (b) show a Raman mapping result of graphene that is formed in pits on a surface of Ni metal, in which FIG. 45(a) shows the intensity distribution of the G band, and FIG. 45(b) shows the intensity distribution of the 2D band.

FIG. 49 shows SEM images of pits formed by synthesis at 900° C. on a surface of an Ni film having polystyrene coated thereon in the case where Ni metal is sputtered on an a-plane or a c-plane of an $\alpha$-$Al_2O_3$ single crystal substrate.

BEST MODE FOR CARRYING OUT THE INVENTION

Figure 1:
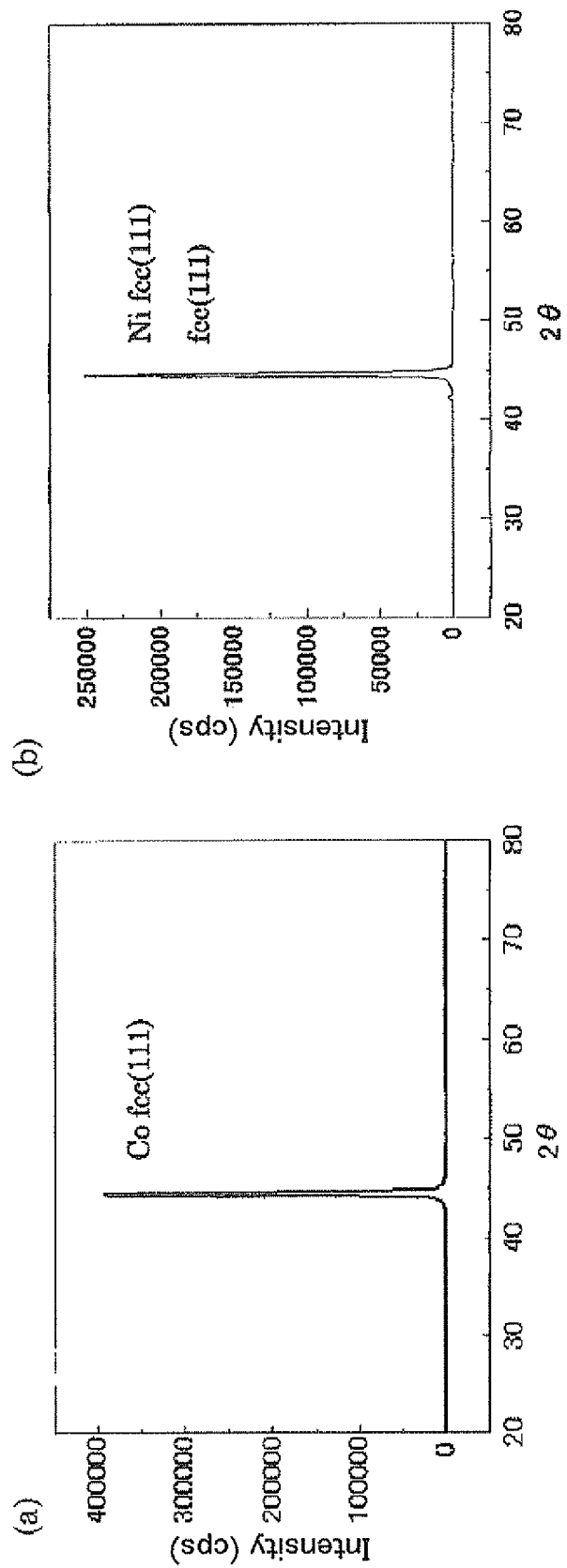
FIG. 1(a) shows an XRD measurement result after sputtering Co metal on a c-plane of a sapphire substrate.
FIG. 1(b) is an XRD measurement result after sputtering Ni metal thereon. The substrate temperature upon sputtering is 300° C.

The invention will be described in detail below.

First Embodiment

In the invention, a graphene sheet is grown by making a carbon material into contact with an epitaxial metal film that is formed on a surface of a single crystal substrate.

In one embodiment of the graphene sheet obtained by the method, the graphene sheet contains a large number of graphene domains, the domains each have an area of from 0.000001 $\mu m^2$ to 100,000 $mm^2$, preferably from 0.000001 $\mu m^2$ to 50,000 $mm^2$, and more preferably from 0.000001 $\mu m^2$ to 100 $mm^2$, and orientations of 6-membered rings in the domains are averagely aligned in a single direction over the graphene sheet.

The language "orientations of 6-membered rings in the domains are averagely aligned in a single direction over the graphene sheet" includes such a state that a LEED (low energy electron diffraction) image of a substrate having the graphene sheet formed thereon has six equally spaced diffraction spots, or the spots with a certain width, or has a ring diffraction pattern having locally distributed intensity observed at a position that is certainly remote from the spots. For example, a LEED image of a composite containing the graphene sheet may have six equally spaced diffraction spots, or may have the spots and a ring diffraction pattern having intensity that is locally distributed around the spots as centers, or may have the sports and a ring diffraction pattern that is locally distributed to twelve spots.

In particular, the invention may provide a graphene sheet having an in-plane shear of the orientation of 6-membered rings is such that 90% or more of the domains have orientations aligned within ±10° or less, and preferably ±5° or less. The in-plane shear of the orientation of 6-membered rings herein can be calculated from a LEED image according to the method shown in Examples described later.

The area of the domains herein is defined as an area of domains confirmed based on the contrast in observation with an SEM. The average domain size is preferably 100 $nm^2$ (0.0001 $\mu m^2$) or more, more preferably 0.01 $\mu m^2$ or more, further preferably 1 $\mu m^2$ or more, and particularly preferably 100 $\mu m^2$ or more. The average domain size herein is defined, for example, as an average value of areas of domains confirmed based on the contrast in observation with an SEM in a portion arbitrarily selected from the graphene sheet.

In one embodiment of the invention, graphene that has the same number of layers in most portion of the graphene sheet is provided.

The language "the same number of layers" herein is based on the number of layers evaluated from the intensity ratio of the 2D band peak and the G band in Raman spectroscopic mapping of the graphene sheet, or the number of layers evaluated from the contrast in observation with an optical microscope or a scanning electron microscope (SEM). In the invention, a graphene sheet having a proportion of graphene that has the same number of layers of 30% or more (for example, from 30 to 100% or from 30 to 80%), preferably 50% or more (for example, from 50 to 100% or from 50 to 90%), more preferably 70% or more, and further preferably 90% or more, may be provided. The graphene having the same number of layers herein includes, for example, single layer graphene having a larger 2D band intensity than the G band intensity, and two-layer graphene and three-layer graphene having a 2D band intensity that is nearly equal to the G band intensity.

In one embodiment of the invention, the graphene sheet is grown on the most area of the epitaxial metal film that is made in contact with the carbon material. For example, embodiments where the graphene sheet is grown on 30% or more, preferably 50% or more (for example, from 50 to 100% or from 50 to 80%), more preferably 80% or more (for example, from 80 to 100% or from 80 to 90%), and further preferably the entire surface (for example, 90% or more) of the epitaxial metal film that is made in contact with the carbon material are included. The area can be evaluated, depending on necessity, by observation with a scanning electron microscope (SEM) or observation with an optical microscope after transferring to a substrate, such as $SiO_2/Si$.

A method for producing the graphene sheet exemplified above will be described below.

The single crystal substrate is not particularly limited, and for example, a metal oxide single crystal of an alkaline earth metal, a transition metal, a rare earth metal or the like may be used. Specific examples thereof include MgO (magnesium oxide), $\alpha$-$Al_2O_3$ (sapphire), $SiO_2$ (quartz), $LaAlO_3$ (LAO) and $TiO_2$ (titanium dioxide).

The size of the single crystal substrate is not particularly limited, and in consideration of production of favorable graphene and other conditions, the size is, for example, from 1 to 1,000,000 $mm^2$, and preferably from 100 to 10,000 $mm^2$.

Examples of the metal species of the metal film include a transition metal and a noble metal, such as Co, Ni, Fe, Cu, Pt, Pd, Ru, Au, Ir, Ti, Al, Ag, Mg, Mn, Cr and Sn.

Upon forming the epitaxial metal film on the surface of the single crystal substrate, for example, sputtering is performed on the single crystal substrate. Sputtering at a higher temperature may provide a film with higher quality. Sputtering at a high temperature may provide an epitaxial metal film that is oriented in the direction of the single crystal substrate.

The heat treatment temperature of the single crystal substrate upon sputtering is preferably from 20 to 800° C., and more preferably from 200 to 500° C., while depending on the kinds of the single crystal substrate and the metal film.

The thickness of the epitaxial metal film is preferably from 0.005 to 10 μm, and more preferably from 0.02 to 0.5 μm, in consideration of production of favorable graphene and other conditions.

A sapphire single crystal substrate includes a c-plane (0001), an a-plane (11-20) and an r-plane (1-102). By forming a Co film on a surface of an MgO (001) plane, fcc-Co(001) is formed. In this case, the epitaxial relationship is fcc-Co{001}//MgO{001}, and the in-plane orientation is fcc-Co<100>//MgO<100>. By forming a Co film on a surface of an MgO (111) plane, an fcc-Co(111) or hcp-Co(0001) film is formed. In the case where Ni is used as the metal, only an fcc structure is formed, and thus structures, such as Ni(001)//MgO(001) or Ni(111)//MgO(111), are formed.

Since graphene has a hexagonal structure, it is desired to produce a metal film having a crystal structure that is well adapted to the hexagonal structure from the standpoint of the epitaxial growth of graphene, and for example, the metal film preferably has a surface periodical structure that is similar to graphene.

A carbon material is made in contact with the surface of the epitaxial metal film, thereby growing a graphene sheet. Examples of the method of making the carbon material into contact therewith include a method of making carbon-containing molecules in a gaseous state into contact therewith for performing carbonization reaction.

Examples of the carbon-containing molecules used include a hydrocarbon and hetero atom-containing molecules.

The hydrocarbon used is preferably a compound having 10 or less carbon atoms, and more preferably a compound having 5 or less carbon atoms. Specific examples thereof include methane, ethane, ethylene, acetylene, propane, propylene, butane, butadiene, pentane, pentene, cyclopentadiene, hexane, cyclohexane, benzene and toluene. These compounds may be used solely or as a combination of two or more kinds thereof.

The hetero atom-containing molecules used are preferably a compound having 10 or less carbon atoms, and more preferably 5 or less carbon atoms, containing a hetero atom, such as oxygen, nitrogen and boron. Specific examples thereof include an alcohol, such as methanol and ethanol, and carbon monoxide.

The carbon-containing molecules are preferably fed at a constant pressure to a chamber, in which a substrate containing a single crystal substrate having formed thereon an epitaxial metal film is disposed. Then, into the chamber, an inert gas such as helium and argon and a hydrogen gas may be fed together with the carbon-containing molecules.

The pressure of the carbon-containing molecules in the chamber may be from the atmospheric pressure to a reduced pressure, preferably from $10^5$ to $10^{-5}$ Pa, and more preferably from $10^5$ to $10^{-3}$ Pa. The heat treatment temperature is preferably from 300 to 1,200° C., and more preferably from 500 to 1,000° C., from the standpoint of the forming speed of graphene and the production of a favorable graphene sheet. The heat treatment time is preferably from 1 to 300 minutes, and more preferably from 1 to 60 minutes.

A heating device for the heat treatment is not particularly limited, and for example, heating with induction heating, radiation heat, laser, infrared ray, microwave, plasma, ultraviolet ray or surface plasmon may be used.

Before synthesizing graphene by CVD, the surface of the metal film as a catalyst may be reduced by hydrogen annealing at a temperature lower than the CVD synthesis temperature, thereby improving the crystallinity of the surface of the metal film even at a high temperature of CVD synthesis. Specifically, the low temperature hydrogen annealing suppresses aggregation of the catalyst metal and formation of pits on the metal film surface, thereby enabling epitaxial growth of graphene having a larger area. It is also effective to perform hydrogen annealing at the CVD temperature after performing the low temperature hydrogen annealing.

The hydrogen annealing may be performed just before the CVD synthesis by disposing a specimen in a chamber for performing CVD. The temperature for the hydrogen annealing is, for example, from 400 to 600° C., and when the annealing time is prolonged, the crystallinity of the catalyst is enhanced, and the quality of graphene synthesized is also enhanced. Feed of the gas for the hydrogen annealing may be performed, for example, by feeding hydrogen at from 400 to 600 sccm along with an inert gas.

Another example of the method of making the carbon material into contact with the epitaxial metal film include a method of forming an organic polymer film as a carbon material on the surface of the epitaxial metal film, and then thermally decomposing the organic polymer in vacuum.

The organic polymer used may be a polymer having a carbon atom on a main chain or a side chain thereof. Specific examples thereof include polystyrene, polymethyl methacrylate, polyethylene and poly-p-phenylene vinylene. Among these, polystyrene is preferred.

A method of forming the organic polymer film is not particularly limited, and for example, the organic polymer film may be formed by spin coating after dissolving the organic polymer in a solvent depending on necessity. Organic molecules, such as fullerene, may be used by accumulating through vapor deposition.

The thickness of the organic polymer film may be adjusted for controlling the introduction amount of the carbon material and controlling the thickness of the graphene sheet. A single layer graphene sheet may be synthesized by decreasing the thickness of the organic polymer film. The thickness of the organic polymer film is preferably from 0.001 to 50 μm, and more preferably from 0.01 to 5 μm, for providing a favorable graphene sheet with from 1 to 30 layers, and particularly from 1 to 20 layers, while depending on the kind of the organic polymer. Furthermore, amorphous carbon, graphite carbon or diamond-like carbon may be used by thinly accumulating by sputtering or the like.

The thermal decomposition of the organic polymer formed on the surface of the epitaxial metal film for growing a graphene sheet may be performed under a pressure of from the atmospheric pressure to a reduced pressure, preferably from $10^5$ to $10^{-9}$ Pa, and more preferably from $10^5$ to $10^{-5}$ Pa, taking care of the heating conditions and cooling conditions, preferably maintaining at a temperature in a range of from 300 to 1,200° C., and more preferably from 500 to 1,000° C., for a period of preferably from 1 to 300 minutes, and more preferably from 10 to 60 minutes. The heat treatment is performed preferably in an atmosphere of an inert gas or a reducing gas. Examples of the heating method used include heating with infrared ray, microwave, induction heating, radiation heating, laser, plasma, ultraviolet ray or surface plasmon.

The carbon material may be made in contact with the surface of the epitaxial metal film by the aforementioned manners, thereby synthesizing a graphene sheet on the surface of the metal film. The graphene sheet thus formed has a large area covering the entire substrate, has high uniformity in number of layers, has a small amount of domain boundaries, and is found to have a crystal orientation with certain regularity (i.e., orientation). The thickness of the graphene sheet may be, for example, from 1 to 30 layers, preferably from 1 to 20 layers, and more preferably from 1 to 10 layers.

Second Embodiment

In one embodiment of the graphene sheet of the invention, a graphene sheet having a triangular, rectangular, hexagonal, octagonal or circular planar shape having an area of from 0.0001 to 1,000,000 μm$^2$, and a graphene sheet having a planar shape having an edge with a zigzag structure or an armchair structure are provided.

The graphene sheet may be synthesized on a surface of an epitaxial metal film by making a carbon material into contact with the surface of the metal film, as described above for the first embodiment. Typically, pits having a rectangular shape or a triangular shape are formed on the epitaxial film upon heating, and the graphene sheet is formed dominantly in the pits. Accordingly, the graphene sheet of the invention may have a characteristic shape, such as a rectangular shape and a triangular shape. The graphene sheet may have the aforementioned planer shape having an area of from 0.0001 to 1,000,000 μm$^2$, and preferably from 0.001 to 10,000 μm$^2$, and the thickness thereof may be from 1 to 30 layers, preferably from 1 to 20 layers, and more preferably from 1 to 10 layers.

The graphene sheet may be obtained by making a carbon material into contact with a surface of an epitaxial metal film in the similar manner as in the first embodiment, and it is considered that the change in crystallinity of the metal film due to the temperature upon sputtering for forming the metal film on the substrate has an influence on the state of the graphene sheet.

The graphene sheet of the first and second embodiments described above may be obtained as a composite containing a single crystal substrate, an epitaxial metal film that is formed on the single crystal substrate, and the graphene sheet that is grown on a surface of the metal film, and the graphene sheet in the composite can be separated from the substrate by an acid treatment. The acid treatment may be performed, for example, by immersing the substrate into an acidic etching solution, such as hydrochloric acid, for example, at a temperature of from 0 to 100° C. for a period of from 10 minutes to 1 week.

The graphene sheet can also be separated from the substrate by a method utilizing a difference in reduction potential of transition metals. For example, such a method has been known that the substrate is immersed in an etching solution of a metal having a small reduction potential, such as iron chloride, thereby removing the metal from the graphene sheet (see, for example, Non-patent Document 2).

The graphene sheet thus separated may be transferred, for example, to an SiO$_2$/Si substrate or a plastic substrate, such as a flexible substrate, by making a liquid containing the graphene into contact with the substrates. A composite containing the graphene sheet having been transferred to the substrate may be applied to a device or the like. For example, a composite having a size (planar area) of from 10 nm$^2$ to 1 m$^2$ may be obtained.

As a convenient method, for example, when the substrate is immersed in an etching solution for a prolonged period of time, the graphene sheet floats on the liquid surface of the etching solution, and the graphene sheet is skimmed with a silicon substrate (such as an SiO$_2$/Si substrate having an oxide film having a thickness of 300 nm), thereby transferring thereto.

In alternative, a polymer, such as PMMA, is spin coated on the surface of the substrate having the graphene sheet is formed thereon, and depending on necessity, a thermal tape capable of being released under heat is adhered to the polymer. The substrate covered with the polymer is immersed in an etching solution, and thus the polymer and the graphene (the thermal tape, the polymer and the graphene in the case where the thermal tape is used) float on the liquid surface. The assembly is recovered, for example, with tweezers, and rinsed with pure water in several times or after immersing in hydrochloric acid rinsed with pure water in several times, and then the assembly is transferred to a silicon substrate. The assembly is slowly dried, and in the case where the thermal tape is used, the thermal tape is released under heat. The substrate is immersed in acetone for dissolving only the polymer, thereby providing the graphene remaining on the substrate. According to the transferring method, the graphene can be recovered with the polymer, such as PMMA, (or the thermal tape and the polymer) without disturbance of the shape of the graphene, and the graphene can be rinsed. Finally, the polymer is removed with an organic solvent, such as acetone, or through a heat treatment, thereby providing the graphene.

EXAMPLE

The invention will be described with reference to examples below, but the invention is not limited to the examples.

1. Formation of Epitaxial Metal Film on Surface of Single Crystal Substrate by Sputtering In the following examples, a c-plane (0001), an a-plane (11-20) and an r-plane (1-102) of sapphire (α-Al$_2$O$_3$), a (100) plane and a (111) plane of MgO, and the like were used as a single crystal substrate.

The single crystal substrate was cut, for example, into an approximately 10 mm square, and the single crystal substrate was disposed in a chamber of an RF magnetron sputtering equipment, and under heating to a temperature of from 300 to 400° C., Co metal or Ni metal was sputtered on the surface of the single crystal substrate (Ar atmosphere, vacuum degree: 0.6 Pa as the standard).

According to the procedures, a Co film or an Ni film having a thickness of from 30 to 500 nm was epitaxially accumulated. One example of the XRD measurement results after sputtering is shown in FIG. 1. A peak of diffraction line from the fcc (111) plane was obtained from the substrate having Co metal or Ni metal accumulated on a c-plane sapphire, as shown in FIGS. 1(a) and (b). It was thus confirmed that an fcc (111) plane film of Co metal or Ni metal was epitaxially grown on the c-plane sapphire.

2. Transferring

In the following examples, for performing detailed evaluation of graphene thus synthesized, a graphene sheet formed on a single crystal substrate was transferred to an $SiO_2$/Si substrate. By transferring the graphene sheet to the $SiO_2$/Si substrate, the contrast caused by the difference in number of layers of the graphene can be easily observed with an optical microscope, and the peak obtained from the graphene in Raman spectroscopy is intensified, which facilitate accurate evaluation.

Typically, the transfer was performed in the following manner. PMMA was spin coated on a single crystal substrate after synthesis and baked at 170° C. for 1 hour, thereby forming a PMMA film for protecting graphene. A thermal tape (Revalpha, produced by Nitto Denko Corporation) cut into a rectangular frame was adhered onto the PMMA film, which was cut with a cutter knife along the outer circumference of the thermal tape. The substrate was immersed in an $FeCl_3$ solution (1 mol/L), and after the graphene floated on the surface of the solution along with the thermal tape and the PMMA by etching the catalyst thoroughly, and the assembly was skimmed with tweezers. After washing out the $FeCl_3$ solution with pure water, the assembly was placed on an $SiO_2$/Si substrate and air dried for approximately 1 hour. The assembly was then heated to 130° C. for negating the tackiness of the thermal tape, the thermal tape was removed from the PMMA film, and finally the PMMA film was removed with acetone.

Example 1

Graphene was synthesized by a CVD method. A horizontal tubular furnace was used, and a single crystal substrate having a catalyst metal formed as a film thereon was placed at the center of the quartz tube mounted on the tubular furnace. A magnet was attached to an end of the specimen support of the substrate, and the substrate as the specimen was slid between a high temperature zone and a low temperature zone of an electric furnace with a magnet outside the quartz tube of the electric furnace, thereby performing quenching and the like of the specimen.

The Co/c-plane sapphire or Ni/c-plane sapphire produced in the aforementioned manner was used as the substrate. Methane gas was used as a carbon material, and hydrogen annealing at 500° C. was performed for the substrate in the quartz tube before CVD synthesis at 900° C. The standard condition of temperature and gas used from the heating step to the cooling step is shown in FIG. 2.

Figure 2:
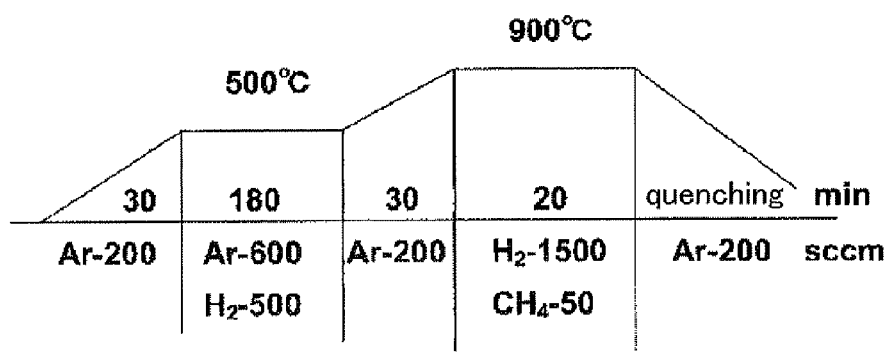
FIG. 2 shows a standard condition of temperature and gas used from a heating step to a cooling step including hydrogen annealing and CVD synthesis.

Under the standard condition shown in FIG. 2, argon gas was fed at a temperature increased to 500° C., then hydrogen annealing was performed, again the atmosphere was replaced by argon, and then methane and hydrogen were fed at a temperature increased to 900° C., thereby synthesizing graphene. Thereafter, the atmosphere was switched to argon, and the substrate was quenched by taking out quickly from the heating zone.

Argon gas was constantly fed at 200 sccm in the heating step and the cooling step, and the electric furnace was set in such a manner that the temperature was increased from room temperature to 900° C. in 60 minutes. The hydrogen annealing was performed by feeding argon gas at 600 sccm and hydrogen gas at 500 sccm for 180 minutes, and the CVD synthesis was performed by feeding methane gas at 50 sccm and hydrogen gas at 1,500 sccm for 20 minutes. The test was performed by changing the hydrogen annealing time and the like from the standard condition.

The crystallinity of the catalyst surface is largely improved by hydrogen annealing at a low temperature. Another test was performed for indicating the phenomenon. Co/c-plane sapphire was used. In the heating step in the process shown in FIG. 2, the electric furnace was maintained at 500° C., and hydrogen annealing was performed by feeding argon gas at 600 sccm and hydrogen gas at 500 sccm for 120 minutes, followed by increasing the temperature to 900° C. as the synthesis temperature. After heating to 900° C. for 20 seconds as the CVD synthesis time, the substrate was cooled under the same condition as in FIG. 2. During the period other than the hydrogen annealing, only argon gas was fed at 200 sccm.

Figure 3:
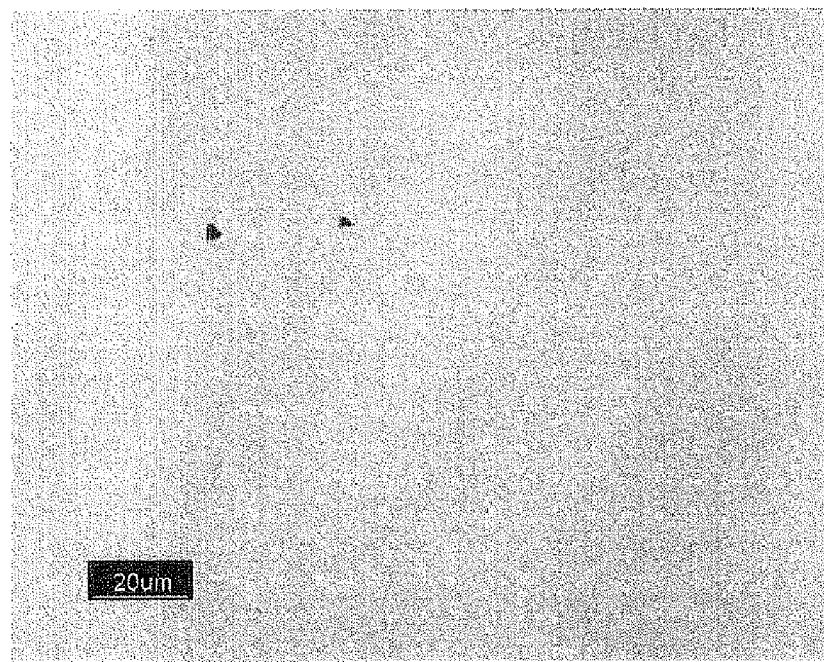
FIG. 3 shows an optical micrograph of a Co/c-plane sapphire surface after low temperature hydrogen annealing.
Figure 4:
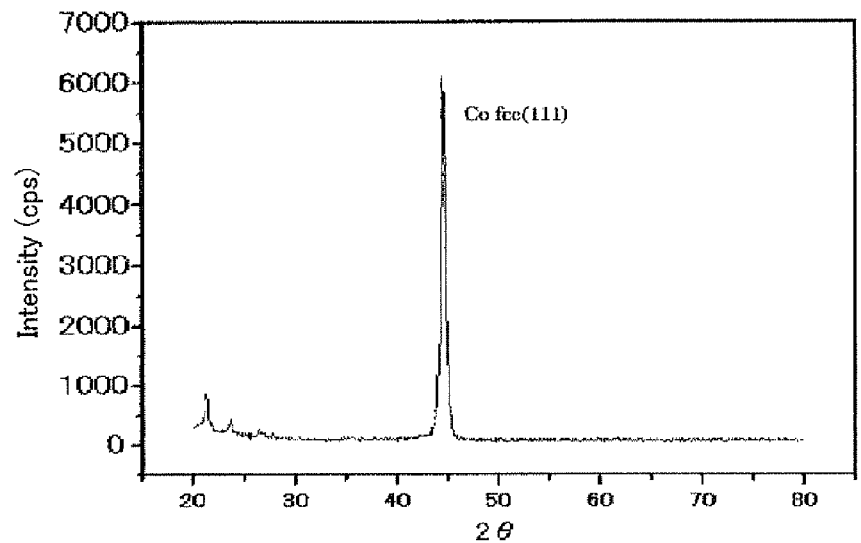
FIG. 4 shows an XRD measurement result of Co/c-plane sapphire after heating to 900° C. after hydrogen annealing, and then cooling to room temperature.

The substrate thus processed was evaluated with an optical microscope and XRD. FIG. 3 shows the optical micrograph of the catalyst surface after the treatment, and FIG. 4 shows the XRD measurement result thereof. As shown in FIG. 3, substantially no pit was observed on the catalyst surface, and as shown by the measurement result shown in FIG. 4, only the peak of the fcc (111) plane was confirmed after heating to 900° C.

Figure 5:
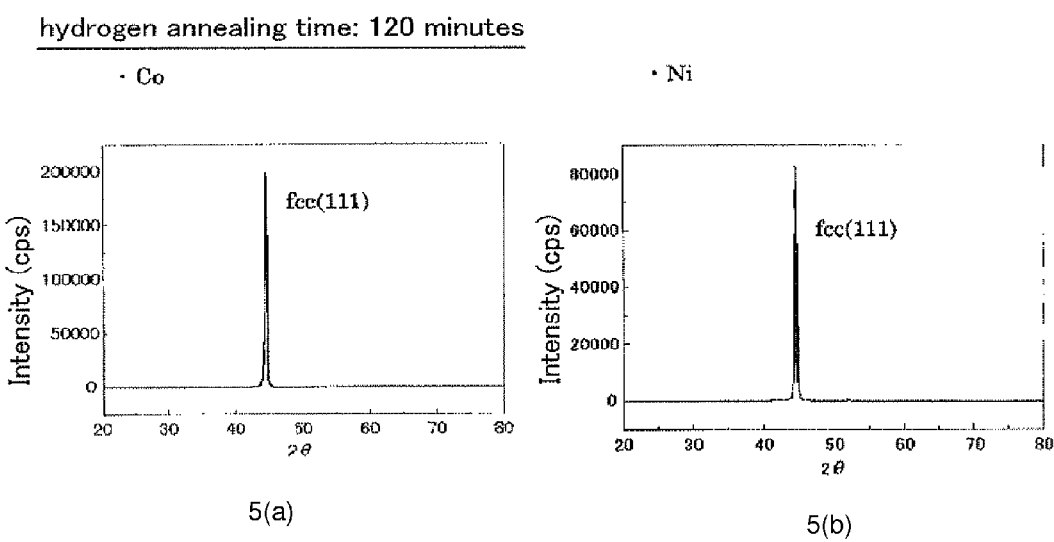
FIG. 5(a) <left side graph> and FIG. 5(b) <right side graph> show XRD measurement results of (a) Co/c-plane sapphire and (b) Ni/c-plane sapphire, after low temperature hydrogen annealing for 120 minutes.
Figure 6:
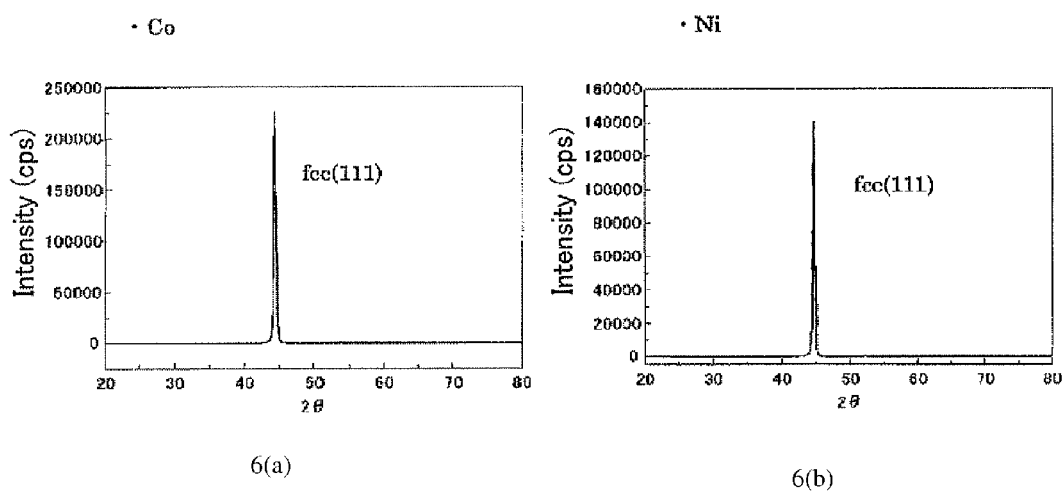
FIG. 6(a) <left side graph> and FIG. 6(b) <right side graph> show XRD measurement results of (a) Co/c-plane sapphire and (b) Ni/c-plane sapphire, after low temperature hydrogen annealing for 180 minutes.

The same test was performed except for changing the low temperature hydrogen annealing time (120 minutes and 180 minutes) and the kind of the metal catalyst (Co and Ni). The XRD measurement results are shown in FIGS. 5 and 6. Only the peak of the fcc (111) plane was obtained for both the Co catalyst and the Ni catalyst, and it was thus considered that the crystallinity was maintained at a high temperature. When the annealing time was prolonged, the peak intensity of the fcc (111) plane was increased with the line width being decreased, and it was thus considered that the crystallinity was enhanced.

Figure 7:
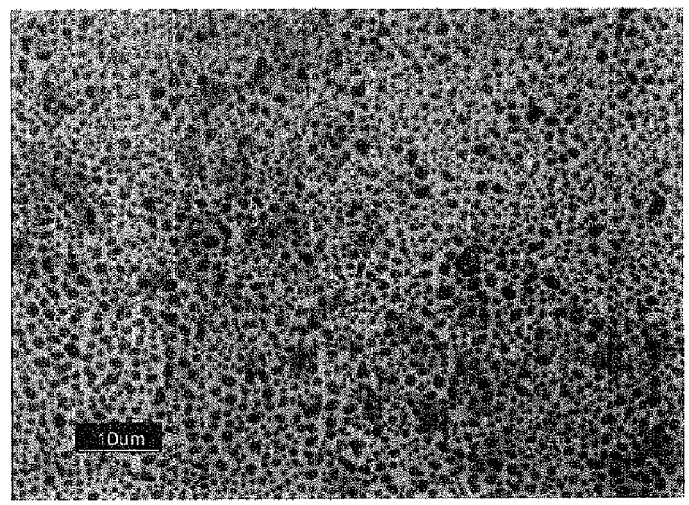
FIG. 7 shows an optical micrograph of a Co/c-plane sapphire substrate surface after hydrogen annealing at 900° C. and then performing CVD synthesis at the same temperature.

On the other hand, when the CVD synthesis was performed under the same condition as in FIG. 2 except that the hydrogen annealing was performed at 900° C., a large amount of black spots were observed on the Co catalyst as shown in FIG. 7. The measurement of the substrate surface with AFM revealed that the black spots were pits of several hundred nanometers. The depth of the pits was larger than the thickness of the catalyst film, and it was thus considered that the metal was aggregated to provide a more stable structure upon heating the catalyst film to 900° C.

Figure 8:
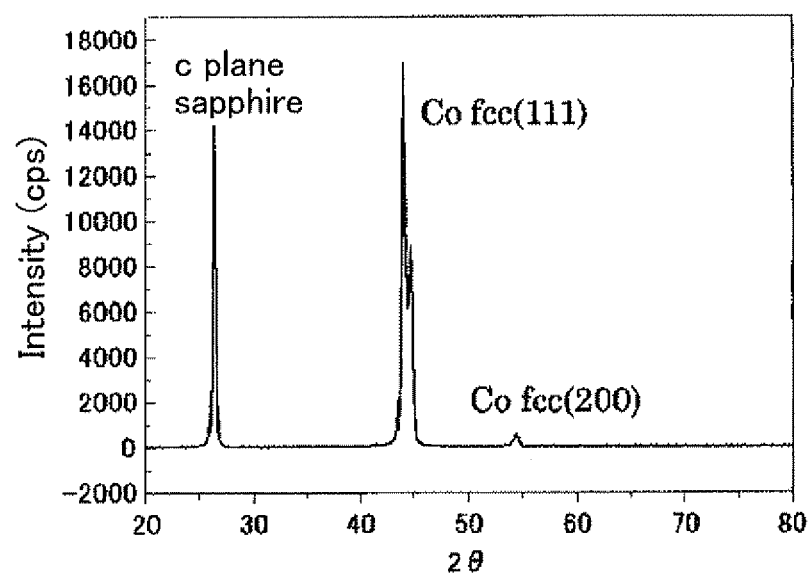
FIG. 8 shows an XRD measurement result of a Co/c-plane sapphire substrate surface after hydrogen annealing at 900° C. and then performing CVD synthesis at the same temperature.

FIG. 8 shows the XRD measurement result of the substrate. While only the peak of the fcc (111) plane was obtained immediately after formation of the film as shown in FIG. 1, peaks from the fcc (200) plane and the sapphire substrate were observed in addition to the fcc (111) plane after performing CVD.

It is considered that uniform epitaxial growth of graphene is difficult to perform if the catalyst has a structure other than the fcc (111) plane after heating to approximately 900° C. It is also considered that when a large number of pits of several hundred nanometers are formed with an interval of several micrometers on the catalyst surface, the area that effectively functions as the fcc (111) plane is decreased, and synthesis of graphene with a large area is inhibited.

Accordingly, it is considered that since the crystallinity of the catalyst film is insufficient as the peak intensity of fcc (111) is considerably decreased after CVD, the fcc (111) plane was broken as a result that the catalyst provides a more stable structure upon heating the substrate to a high temperature, and the large number of pits are also formed during the process. On the other hand, when hydrogen annealing is performed at a temperature lower than the CVD synthesis temperature in the stage before heating the substrate to 900° C., the catalyst surface was reduced, and simultaneously a fcc (111) plane with high crystallinity is obtained, thereby maintaining even at a high temperature the catalyst surface with high crystallinity suitable for epitaxial growth of uniform graphene.

Then, graphene was synthesized under the condition shown in FIG. 2, and then evaluated. The graphene was evaluated after transferring the graphene from the c-plane sapphire to an SiO$_2$/Si substrate by the aforementioned method.

An optical microscope (NIKON ECLIPSE ME600) was used for observing the graphene after the CVD synthesis. A Raman spectroscopic equipment (JASCO NRS-2100) was used for evaluating the number of layers of the graphene. Upon measuring graphene with a Raman spectroscopic equipment, the D band derived from the amorphous structure, the G band (approximately from 1,580 to 1,590 cm$^{-1}$) derived from graphite structure, and the 2D band (approximately from 2,675 to 2,715 cm$^{-1}$) derived from the graphene are obtained, and the number of layers of graphene can be evaluated by using them. It is determined that in the resulting peaks, when $I_G$ (G band intensity)<$I_{2D}$ (2D band intensity), single layer graphene is formed, when $I_G \approx I_{2D}$, two-layer graphene is formed, and when $I_G > I_{2D}$, three or more-layer graphene is formed.

FIG. 9 shows optical micrographs of the graphene synthesized with Co/c-plane sapphire (hydrogen annealing time: 180 minutes). Graphene with several hundred micrometers or more was confirmed from the optical micrograph with a low magnitude (FIG. 9(a)), and it was thus considered that graphene having a sufficient area was synthesized. Upon observation with an increased magnitude (FIG. 9(b)), the presence of an area that was considered as close as single layer graphene was observed.

Figure 10:
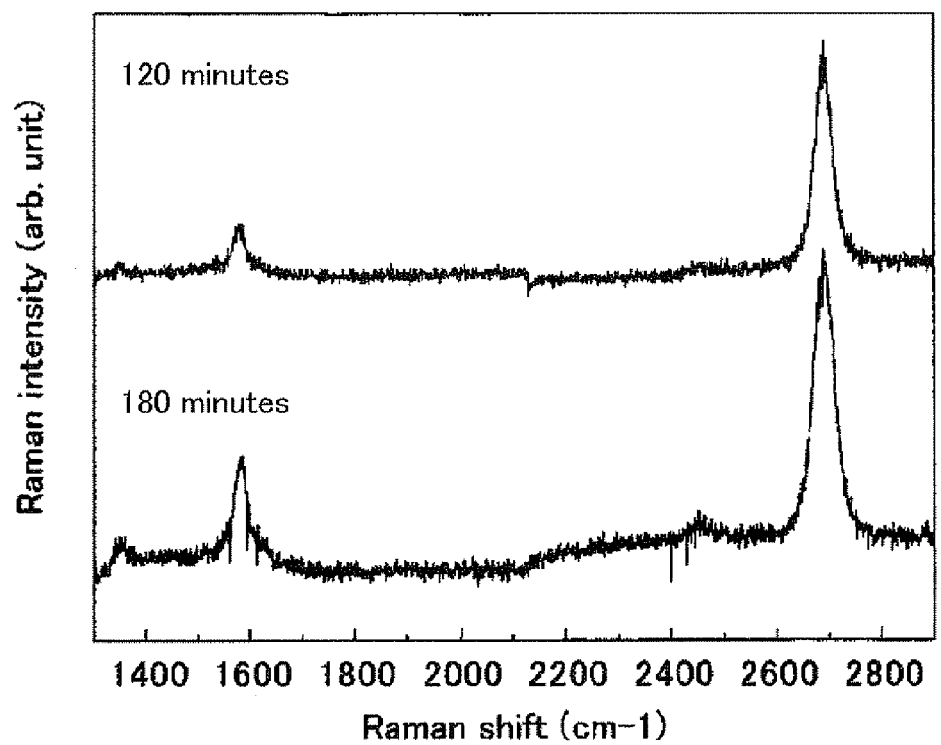
FIG. 10 shows a Raman spectrum of graphene that is synthesized with Co/c-plane sapphire and transferred to a silicon substrate. The band around 1,585 cm$^{-1}$ is designated as the G band, and the band around 2,675 cm$^{-1}$ is designated as the 2D band.

FIG. 10 shows a Raman spectrum of graphene synthesized with Co/c-plane sapphire (hydrogen annealing time: 120 minutes and 180 minutes). The presence of single layer graphene was thus confirmed.

Figure 11:
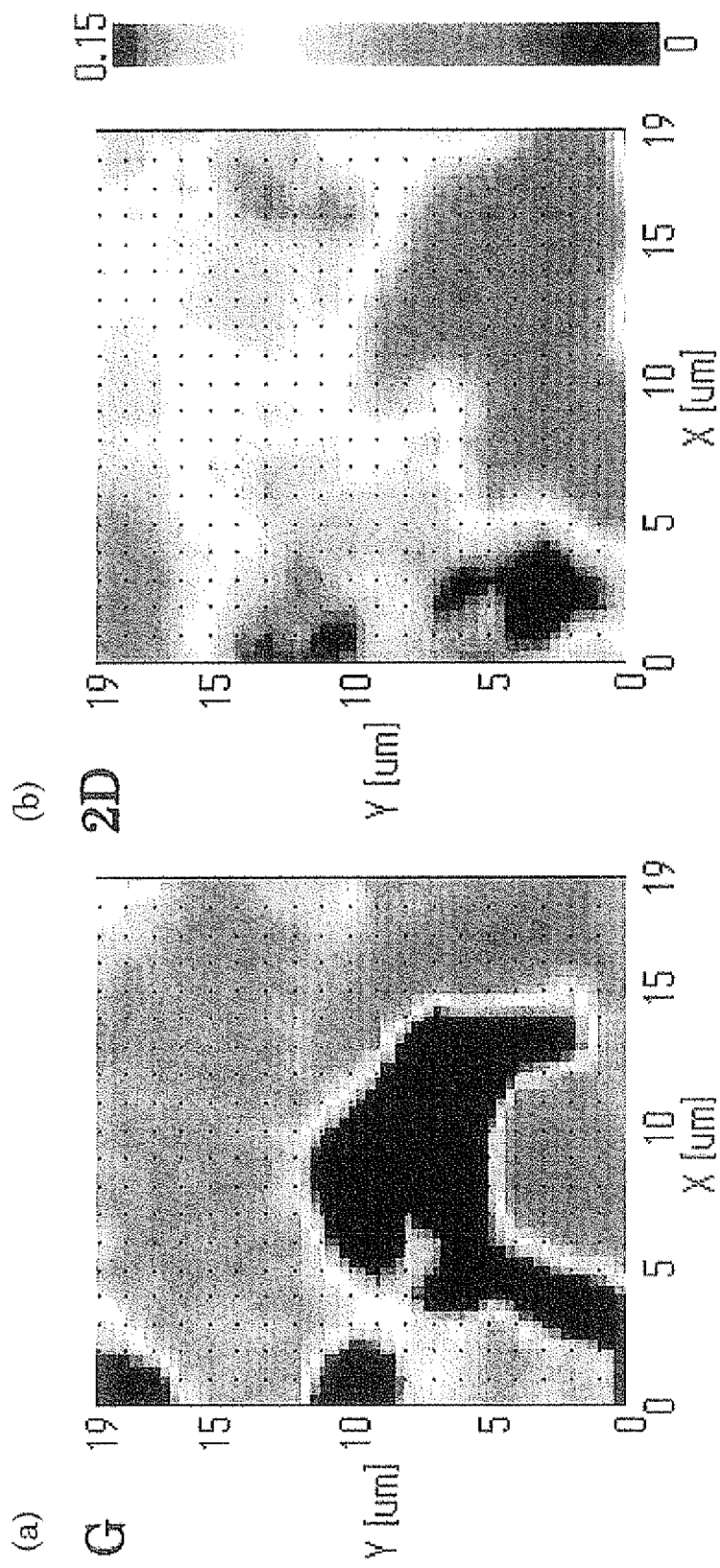
FIGS. 11(a) and (b) show Raman mapping results of graphene that is synthesized with Co/c-plane sapphire and transferred to a silicon substrate ((a) hydrogen annealing time: 180 minutes, G band, (b) hydrogen annealing time: 180 minutes, 2D band).

Then, for investigating the extent of the area that was occupied by single layer graphene, measurement was performed with the mapping function of the Raman spectroscopic equipment. In the measurement, 400 points in total were measured within an area of 20 μm×20 μm with an interval of 1 μm. FIG. 11 shows the measurement result (hydrogen annealing time: 180 minutes). In the figure, the Raman shift ranges capable of measuring the G band and the 2D band, respectively, were measured separately, and the peak intensities were shown by colors.

The measurement result revealed that while multi-layer graphene was present, single layer graphene was present uniformly in a wide area within the measurable area. It was considered that the area of single layer graphene occupied 50% or more of the entire area. It is considered that the area of single layer graphene also occupied 50% or more of the entire area in the case where the hydrogen annealing was performed for 120 minutes.

FIG. 12 shows optical micrographs of graphene synthesized with Ni/c-plane sapphire (hydrogen annealing time: 180 minutes). As similar to the case using the Co catalyst, graphene with several hundred micrometers or more was confirmed from the optical micrograph with a low magnitude (FIG. 12(a)), and it was thus considered that graphene having a sufficient area was synthesized. Upon observation with an increased magnitude (FIG. 12(b)), the portion that was considered as multi-layer graphene was found in some places, but single layer graphene was formed in the other portions, which resulted in a uniform sheet observed.

Figure 13:
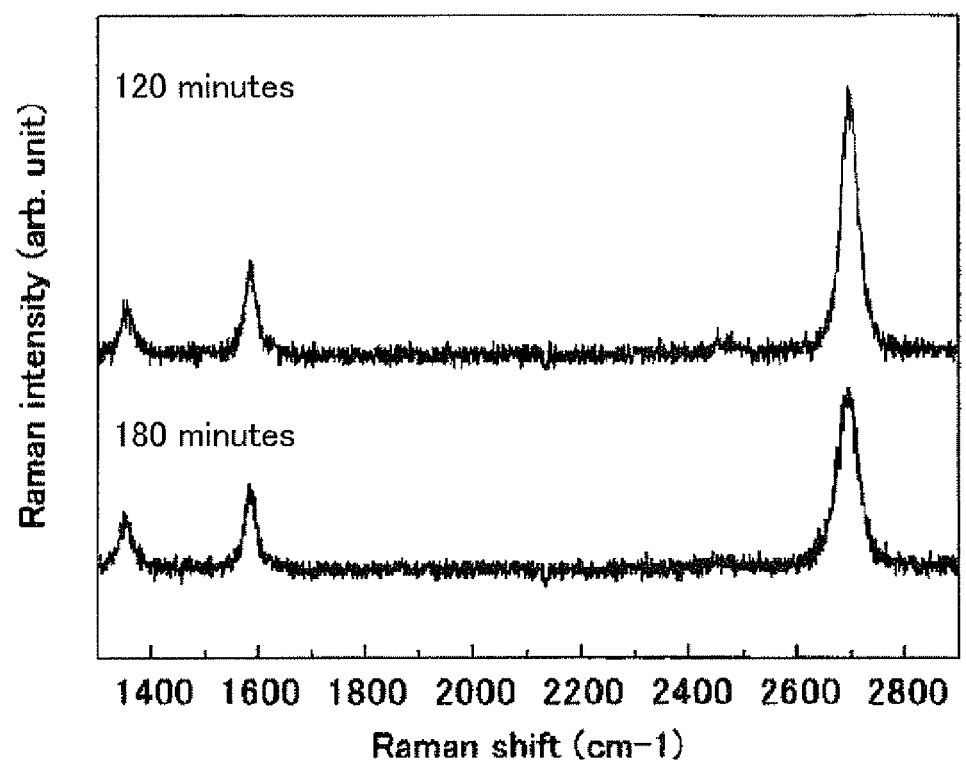
FIG. 13 shows a Raman spectrum of graphene that is synthesized with Ni/c-plane sapphire and transferred to a silicon substrate.

FIG. 13 shows a Raman spectrum of graphene synthesized with Ni/c-plane sapphire (hydrogen annealing time: 120 minutes and 180 minutes). As similar to the case using the Co catalyst, peaks of single layer graphene were obtained from the area that was considered as single layer graphene.

Figure 14:
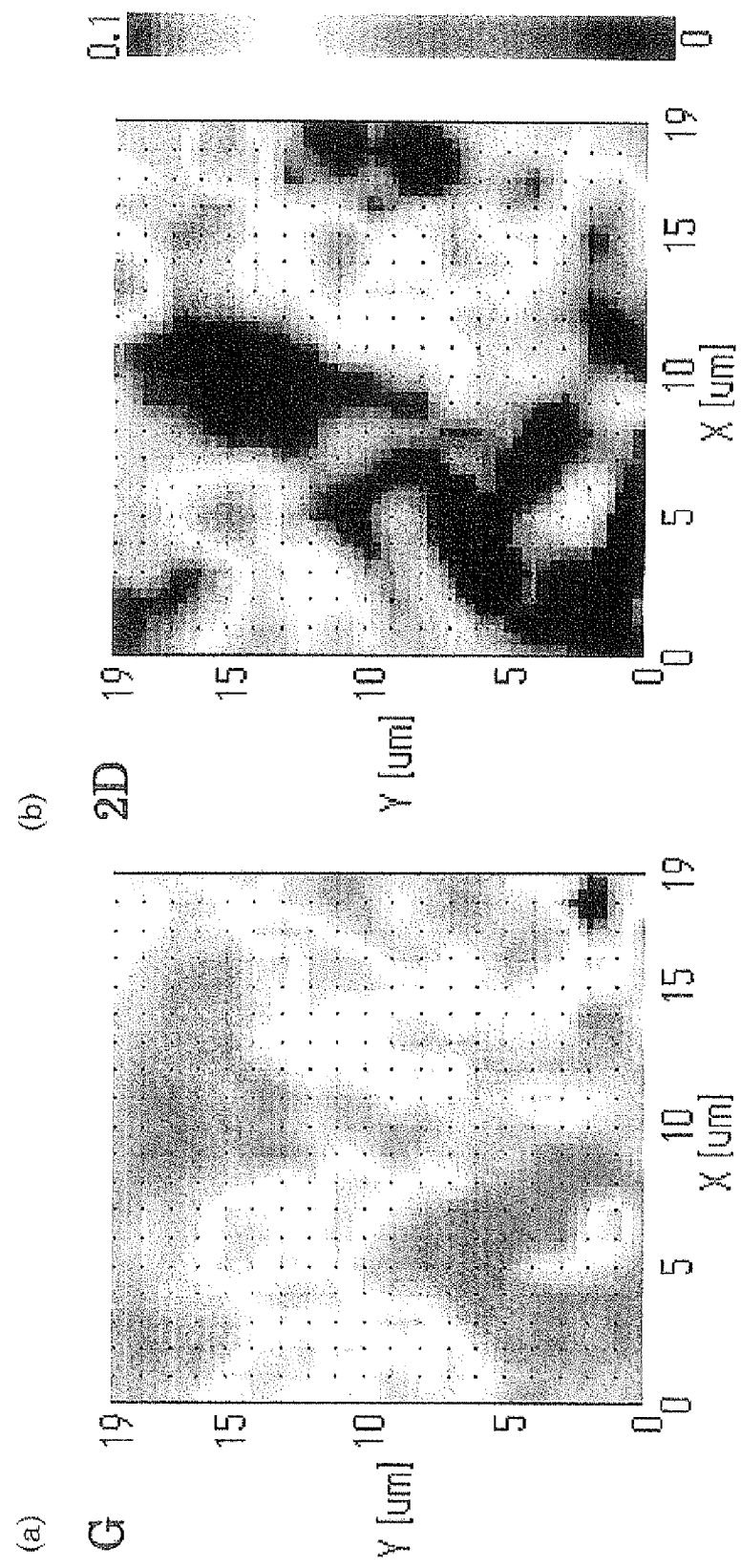
FIGS. 14(a) and (b) show Raman mapping results of graphene that is synthesized with Ni/c-plane sapphire and transferred to a silicon substrate ((a) hydrogen annealing time: 180 minutes, G band, (b) hydrogen annealing time: 180 minutes, 2D band).

Then, for investigating the extent of the area that was occupied by single layer graphene, measurement was performed with the mapping function of the Raman spectroscopic equipment. FIG. 14 shows the measurement result (hydrogen annealing time: 180 minutes).

The measurement result revealed that single layer graphene was present in the most area, and single layer graphene was obtained with a large area.

Then, synthesis was performed by changing the synthesis condition from the condition shown in FIG. 2, i.e., methane gas was fed at 15 sccm, and hydrogen gas was fed at 450 sccm, thereby controlling the methane gas concentration to 3 vol %. The substrate used was Co/c-plane sapphire and Ni/c-plane sapphire.

FIG. 15 shows results of observation with an optical micrograph of the graphene thus synthesized and transferred to an SiO$_2$/Si substrate.

It was considered from the optical micrograph with a low magnitude (FIG. 15(a)) that graphene was deposited on approximately from 70 to 80% of the entire area in the case using the Co catalyst. The confirmation was performed by extracting only the G component from the RGB components of the optical micrograph, and analyzing the spatial distribution (pixel distribution) of the intensity thereof. Upon observation with an increased magnitude (FIG. 15(b)), there was substantially no portion with multi-layer on the graphene thus deposited, and it was thus considered that the proportion of the single layer exceeds 90% within the area of 10 mm.

In the case using the Ni catalyst, it was considered that graphene was synthesized with substantially no multi-layer portion in the entire surface thereof (FIGS. 15(c) and (d)).

Figure 16:
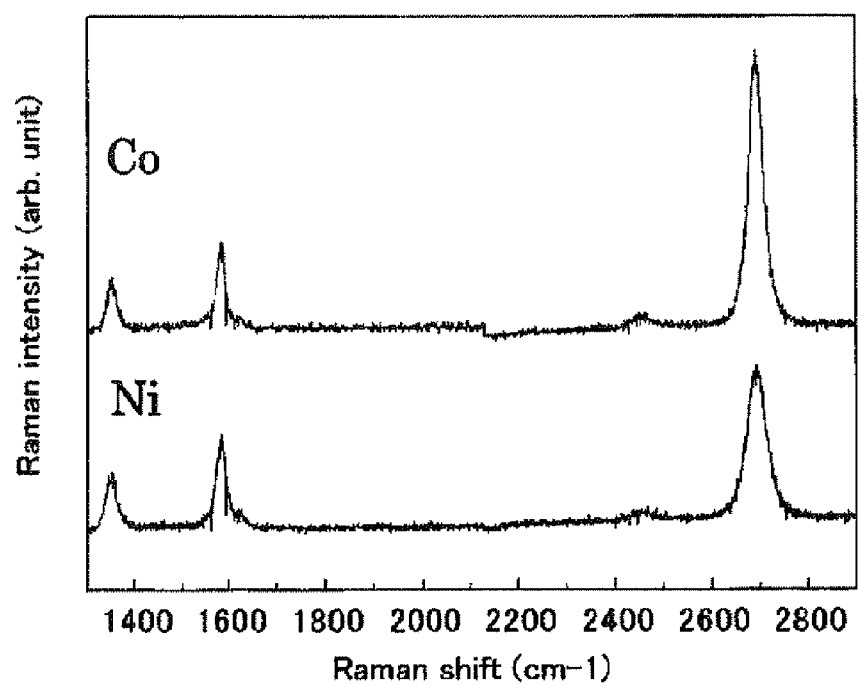
FIG. 16 shows a Raman spectrum of graphene that is synthesized with CH$_4$=3 vol % (H$_2$: 450 sccm, CH$_4$: 15 sccm) and transferred to a silicon substrate.

FIG. 16 shows a measurement result of Raman spectrum of the graphene. Sharp peaks of single layer graphene were obtained from the graphene of both the cases, and it was considered therefrom in addition to the optical micrographs that single layer graphene was synthesized in a wide area.

For investigating the area of single layer graphene, a Raman mapping measurement was performed on the graphene. On the graphene of both the cases, the intensity of the 2D band peak was larger than that of the G band peak in the most area, and it was thus considered that graphene with a single layer area occupying 70% or more of the entire area was synthesized.

Then, for evaluating the crystal orientation of the graphene thus synthesized, the low energy electron diffraction LEED of the graphene thus synthesized under the conditions in FIG. 2 was measured.

In the LEED method, low energy electrons of several ten to several hundred eV having a wavelength that is equivalent to the atomic interval of the typical crystal were made incident on a surface of a substance, thereby providing a diffraction image with the atoms on the surface as the diffraction lattice (LEED image). The diffraction image reflects the two-dimensional periodicity on the surface and is the inverted lattice diagram of the surface atoms, and therefore the structure of the surface atoms can be analyzed by obtaining the diffraction image.

The surface of the substrate after the CVD synthesis was measured, thereby confirming as to whether or not the graphene was grown epitaxially on the fcc (111) plane of Co or Ni as the catalyst and had well aligned crystal orientation. Specifically, an electron beam was radiated perpendicular to the substrate, and a LEED image was measured by observing the scattering thereof, thereby analyzing the symmetry of the substrate surface.

Figure 18:
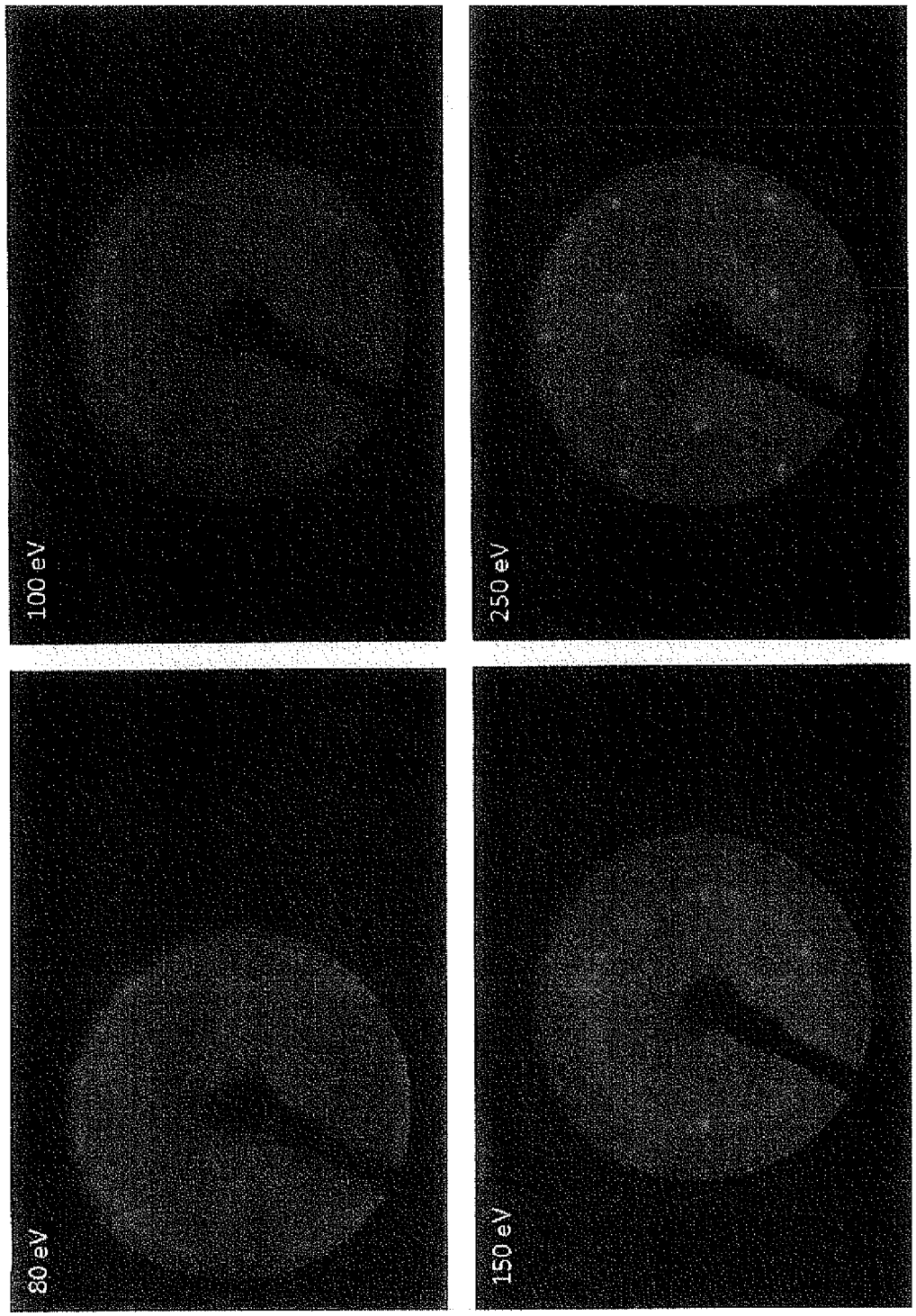
FIG. 18 shows LEED images of graphene/Co/c-plane sapphire of the graphene synthesized under the conditions in FIG. 2.
Figure 19:
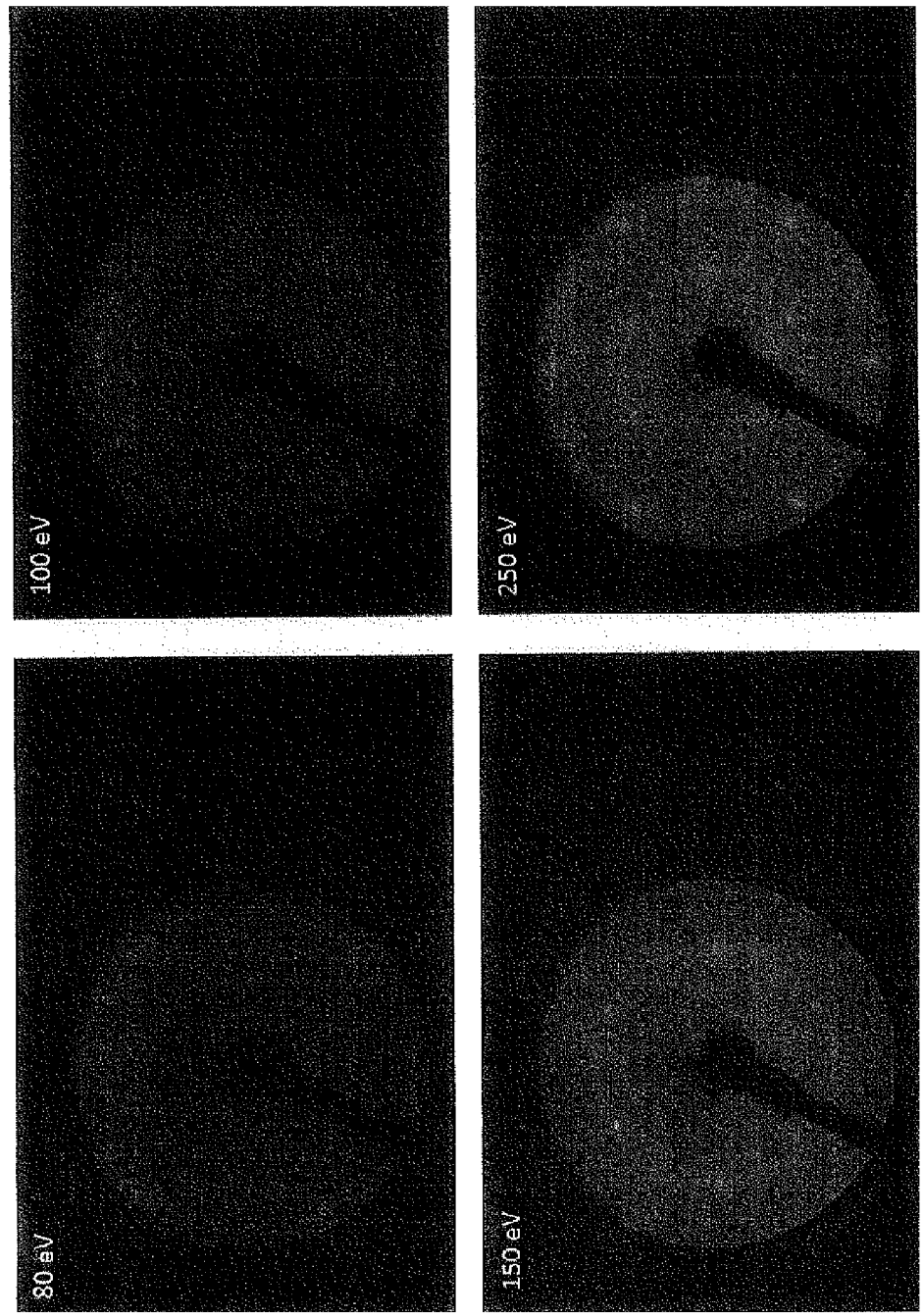
FIG. 19 shows LEED images of graphene/Ni/c-plane sapphire of the graphene synthesized under the conditions in FIG. 2.

FIG. 18 shows LEED images of graphene/Co/c-plane sapphire of the graphene synthesized from the Co/c-plane sapphire under the conditions in FIG. 2, and FIG. 19 shows LEED images of graphene/Ni/c-plane sapphire of the graphene synthesized from the Ni/c-plane sapphire under the conditions in FIG. 2.

As shown in FIGS. 18 and 19, a ring diffraction pattern was observed in addition to six diffraction spots.

Both Co/c-plane sapphire and Ni/c-plane sapphire have six-fold symmetry as similar to graphene, and it is thus considered that in the LEED images, six equally spaced diffraction spots are provided in all the cases. In the case where graphene is epitaxially grown on the fcc (111) plane, it is considered that the diffraction pattern overlaps the six spots.

Figure 20:
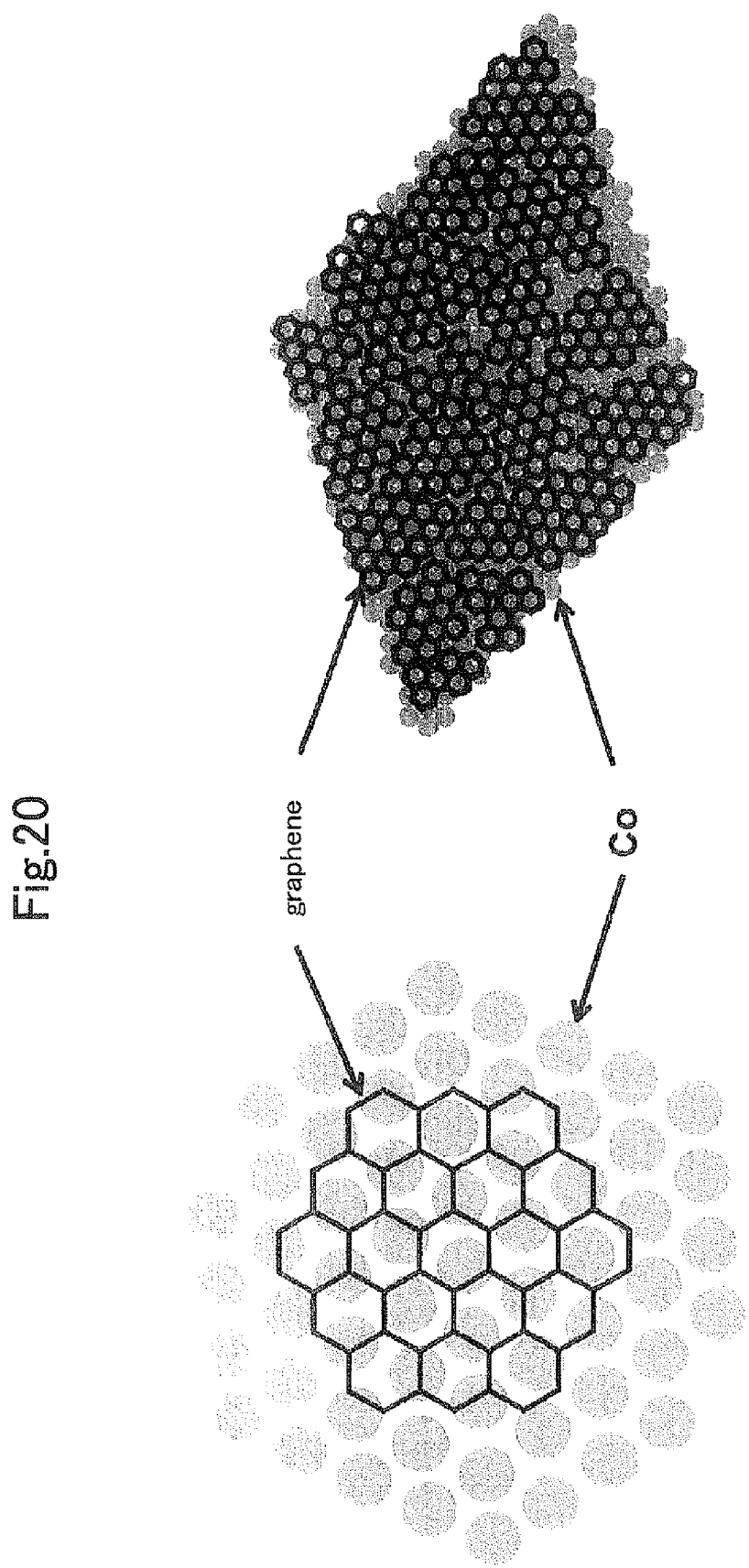
FIG. 20 is an illustration schematically showing a structure of graphene on a metal catalyst as an underlayer, which is derived from the LEED image.

In FIGS. 18 and 19, on the other hand, a ring diffraction pattern, which was expected to be derived from the graphene, was observed at the position slightly deviated from the spots. The ring pattern was not a complete ring but had fluctuation in intensity along the ring, and there was relatively high intensity observed at the position deviated from the spot by 30°. Therefore, it was understood from determination based on the model structure with consistency that as shown in FIG. 20, the graphene was deposited with a structure that was deviated from the metal catalyst as the underlayer by approximately 30° (which was considered to be 25° and 35° accurately), and the structure was relatively aligned in orientation within the beam diameter of 1 mm. That is, it was considered that the graphene synthesized by CVD was grown with an orientation having certain regularity with respect to the metal catalyst as the underlayer.

The surface structure of the graphene was then observed with a scanning electron microscope (SEM) for evaluating what type of domain was owned by the graphene thus synthesized. The use of SEM enables observation of contrast change caused by the difference in number of layers of graphene, and thus the domain size of graphene immediately after synthesis can be measured.

FIGS. 21 and 22 show SEM images obtained from the substrate subjected to the synthesis with a methane gas concentration of 3 vol %. In the SEM image, a darker image is provided at the position with thicker graphene.

There was substantially no dark area, which was expected to be multi-layer graphene, with any catalyst, and images with contrast including three areas, i.e., a white layer, a light gray layer and a dark gray layer, occupied the most area on the substrate. The white layer had a large difference in contrast from the other layers, and it was thus considered that the white layer was an area where the catalyst metal was exposed, and the light gray area was single layer graphene. It was considered from FIGS. 21 and 22 that the graphene was present in a wide area with a domain size of approximately 1 $\mu m^2$ in average.

Accordingly, it was considered that 70% of the entire area of the substrate was covered with single layer graphene. The number of images constituting the contrast was suppressed, and the number of domains was small, which suggested that the number of layers and the crystal structure were controlled.

Figure 23:
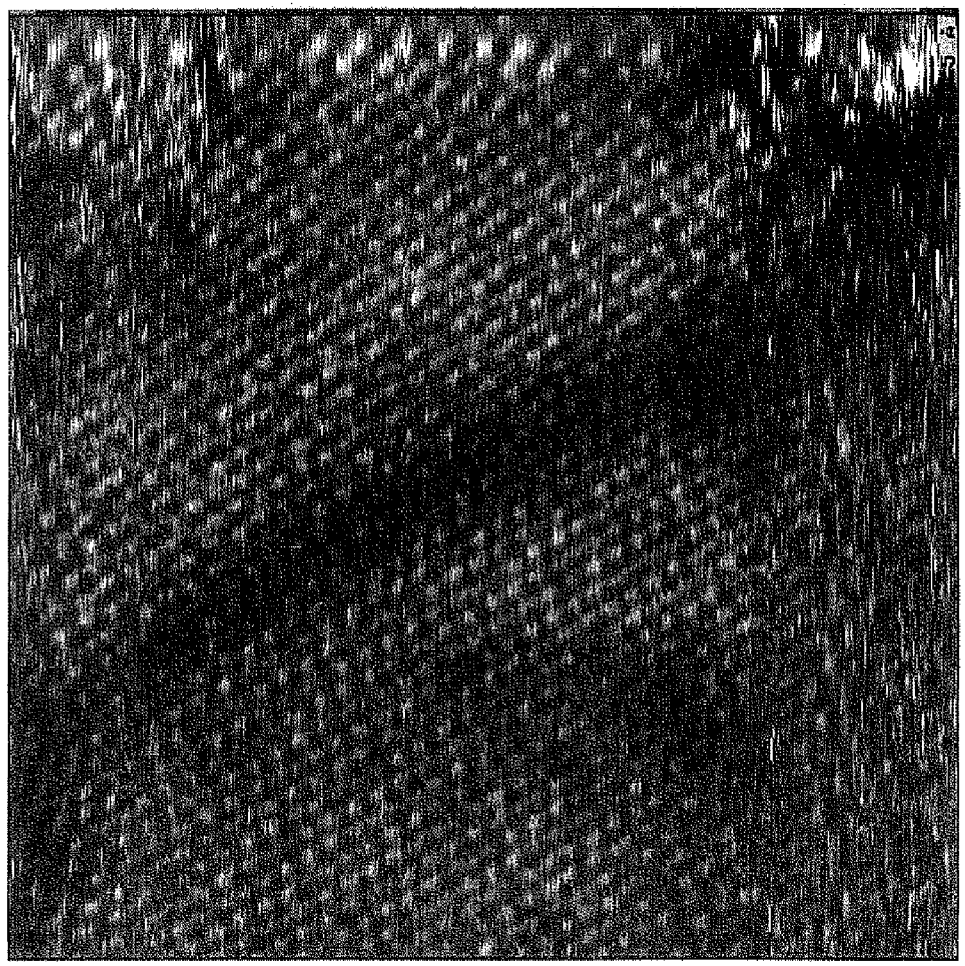
FIG. 23 shows an STM image (10 nm×10 nm) of synthesized graphene.

FIG. 23 shows an STM (scanning tunnel microscope) image (10 nm×10 nm) of the graphene thus synthesized. It was confirmed that clear domains with a continuous sheet were obtained.

Example 2

Figure 24:
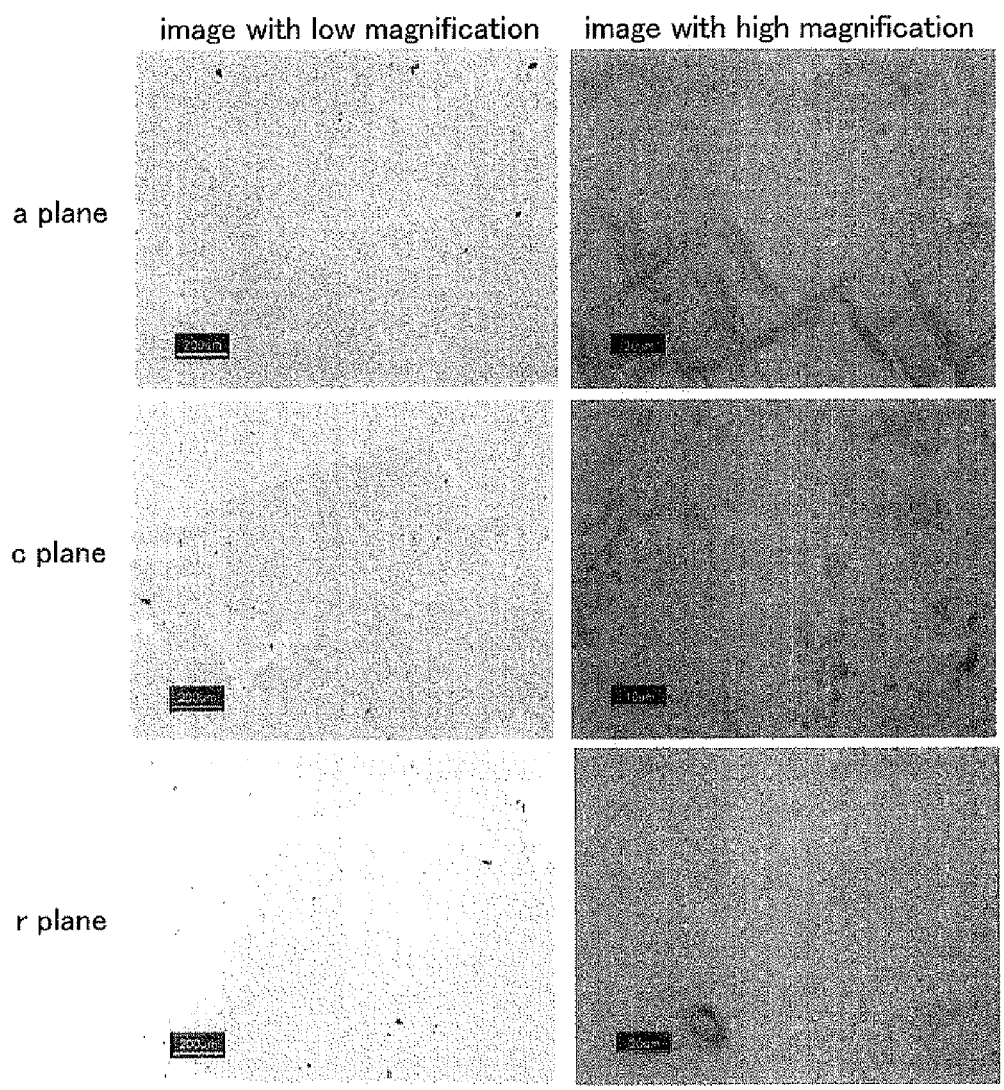
FIG. 24 shows optical micrographs of graphene that is synthesized with Co/a-plane sapphire, Co/c-plane sapphire or Co/r-plane sapphire and transferred to a silicon substrate.
Figure 25:
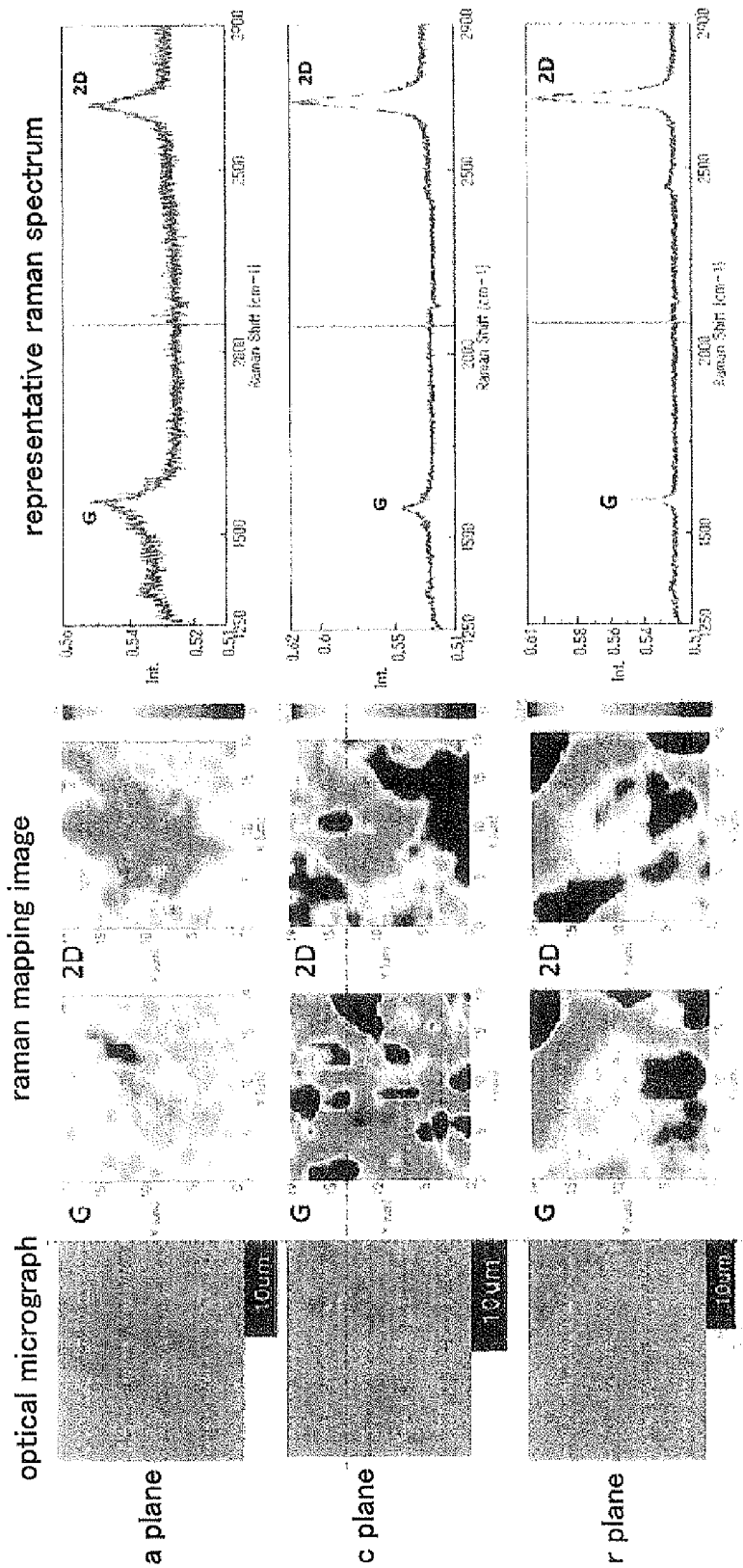
FIG. 25 shows optical micrographs (left), Raman mapping data at the same position (center) and representative Raman spectra (right) of graphene that is synthesized with Co/a-plane sapphire, Co/c-plane sapphire or Co/r-plane sapphire and transferred to a silicon substrate.

Graphene was synthesized according to Example 1 by using a substrate containing a Co catalyst formed as a film on an a-plane, a c-plane or an r-plane of sapphire. The resulting graphene was transferred to an $SiO_2$/Si substrate. The optical micrographs thereof are shown in FIG. 24. FIG. 25 shows optical micrographs (left), Raman mapping data at the same position (center) and representative Raman spectra (right). Uniform graphene was synthesized in a wide area in all the case of an a-plane, a c-plane and an r-plane.

Example 3

CVD synthesis was performed in vacuum by using ethanol as the carbon material. An r-plane of sapphire was used as the substrate. The substrate was disposed in a vacuum chamber and heated from room temperature to 750° C. in 30 minutes at $10^{-5}$ Pa. After heating, CVD synthesis was performed by feeding ethanol at 2 Pa for 60 minutes, and then the substrate was cooled radiationally at $10^{-5}$ Pa.

Figure 26:
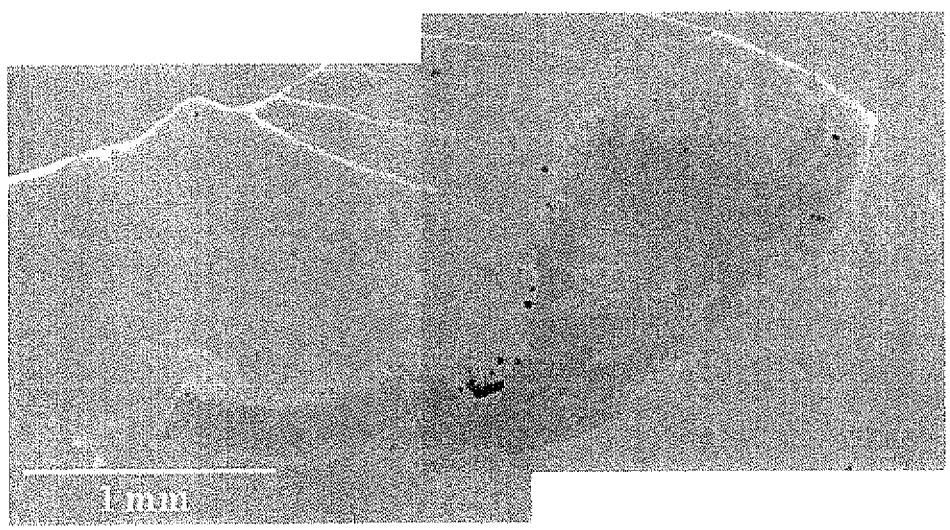
FIG. 26 shows an optical micrograph of graphene that is synthesized with Co/r-plane sapphire and ethanol as a raw material and transferred to a silicon substrate.
Figure 27:
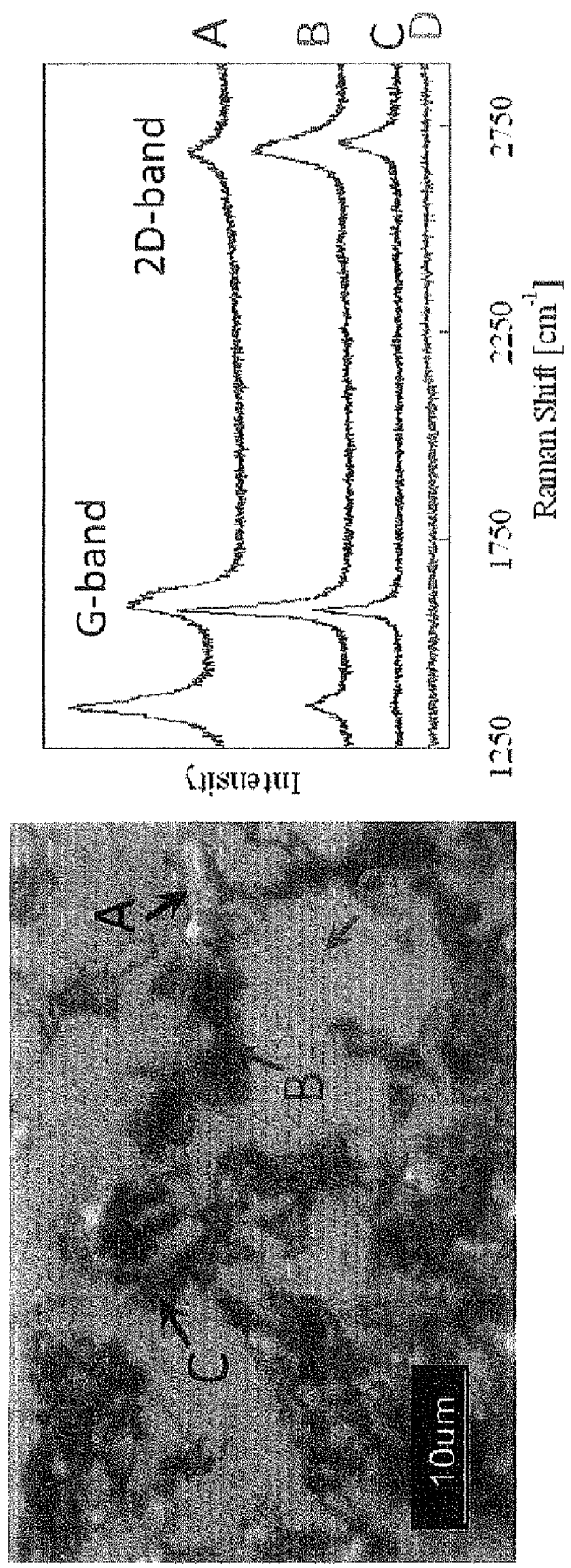
FIG. 27 shows an optical micrograph and a Raman spectrum corresponding to the position thereof of graphene that is synthesized with Co/r-plane sapphire and ethanol as a raw material and transferred to a silicon substrate.

The resulting graphene was transferred to an $SiO_2$/Si substrate. The optical micrograph showing the large film with a size of 1 mm or more is shown in FIG. 26. FIG. 27 shows an optical micrograph and a Raman spectrum corresponding to the positions A to D thereof of the graphene transferred to the $SiO_2$/Si substrate. Thus, graphene was synthesized in a wide area.

Example 4

Synthesis of graphene through thermal decomposition of a polymer was performed. An Ni/MgO (100) substrate was used, and polystyrene was spin coated on the Ni film and then heated in vacuum. While the substrate was maintained in vacuum of approximately $10^{-4}$ Pa, the substrate was heated to 900° C. in 5 minutes, maintained for 30 minutes, and then cooled to room temperature. An infrared gold image furnace was used for heating, and cooling was performed at a sufficient rate. For synthesizing a uniform graphene sheet, it is preferred that the metal catalyst, such as Ni, is relatively thick, and accumulation by sputtering is performed at a high temperature. Specifically, a thickness of 100 nm or more and an accumulation temperature of 350° C. or more are preferred.

Figure 28:
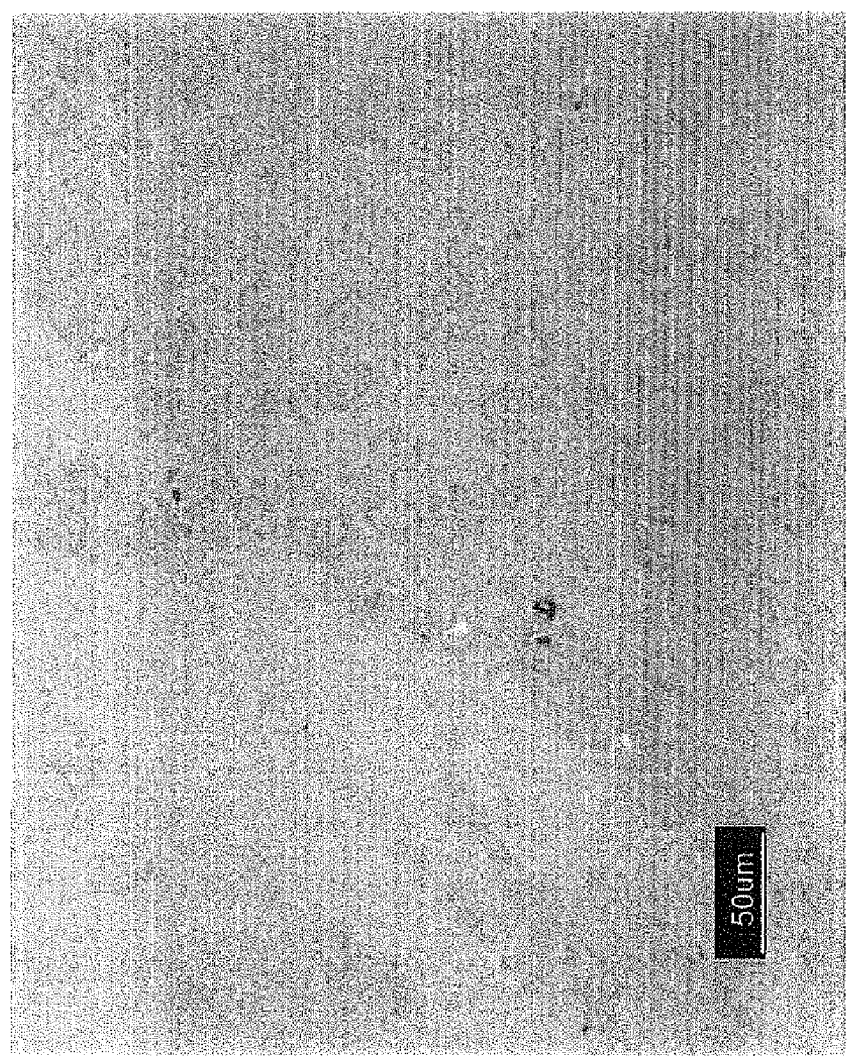
FIG. 28 shows an optical micrograph of graphene that is synthesized by thermal decomposition of polystyrene with an Ni/MgO(100) substrate and transferred to a silicon substrate.

The resulting graphene was transferred to an $SiO_2$/Si substrate. The optical micrograph thereof is shown in FIG. 28. For demonstrating the fact that the graphene sheet is formed on the entire surface, the micrograph includes a broken portion appearing in the view field. The squares in the micrograph show the graphene formed in the pits. Accordingly, the graphene in the pits was not isolated, and the graphene with a substantially uniform thickness was formed on the entire surface of the substrate.

Figure 29:
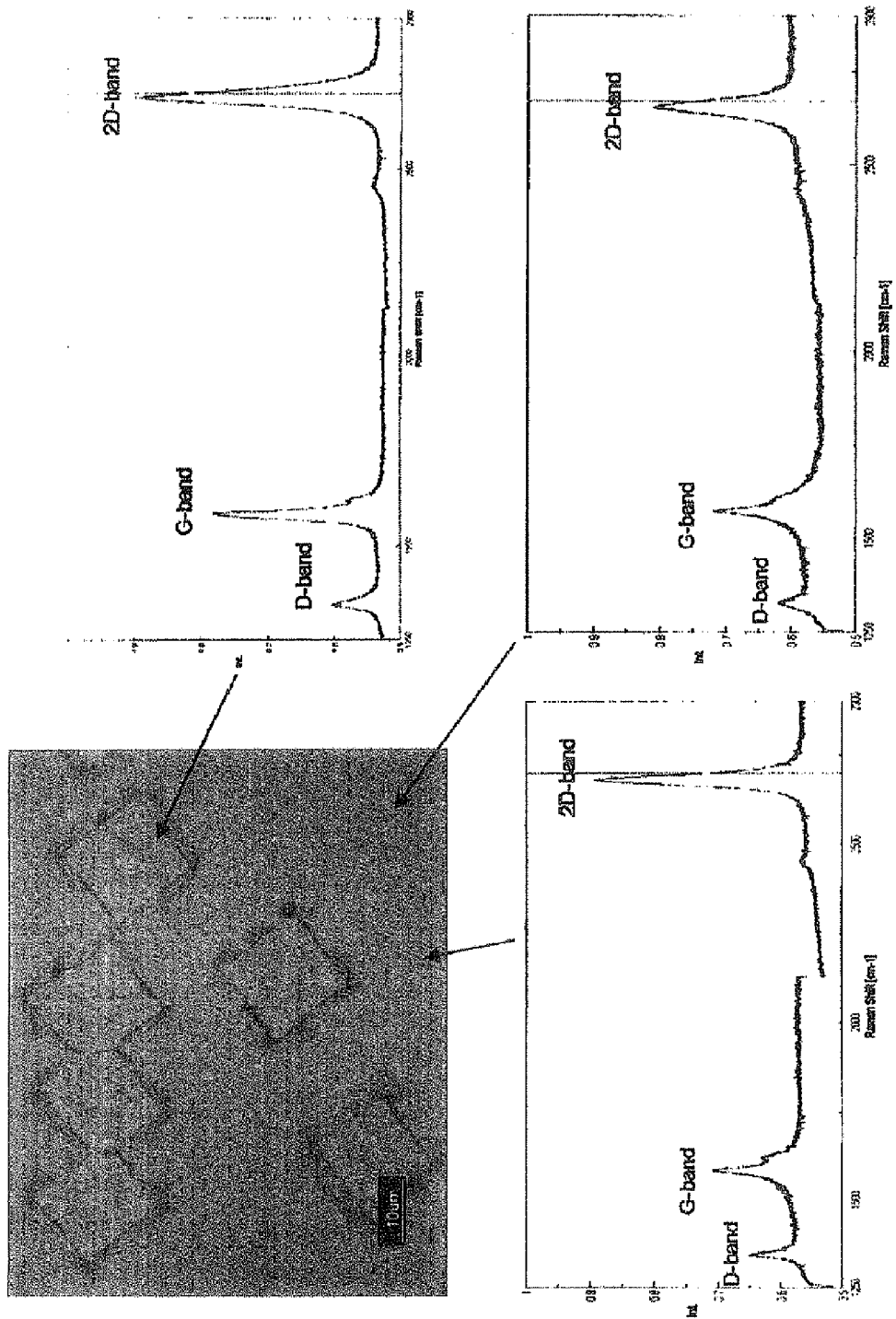
FIG. 29 shows an optical micrograph obtained by enlarging FIG. 28 and Raman spectra at the positions mentioned therein.

FIG. 29 shows an optical micrograph obtained by enlarging FIG. 28 and Raman spectra at the positions mentioned therein. The optical micrograph has uniform contrast except for the vicinities of the pits, and it was thus expected that the number of layers was uniform. In the Raman spectra, the 2D band was stronger than the G band, and it was thus considered that single layer or two-layer graphene was formed and transferred on the entire surface.

When sputtering was performed at a relatively high temperature (400° C. rather than 300° C.) upon production of the Ni/MgO (100) substrate, the crystallinity of the metal catalyst was increased, and a graphene sheet with better quality was obtained.

Example 5

In Example 1, the growing temperature was changed to 1,000° C. The reaction of CVD was performed with CH$_4$ at 5 sccm and H$_2$ at 300 sccm, i.e., a lower methane concentration than the case at 900° C. The gas and the flow rate thereof upon quenching were changed to Ar at 800 sccm and H$_2$ at 35 sccm, and graphene was synthesized under the same condition as in Example 1 except for those mentioned above.

Figure 30:
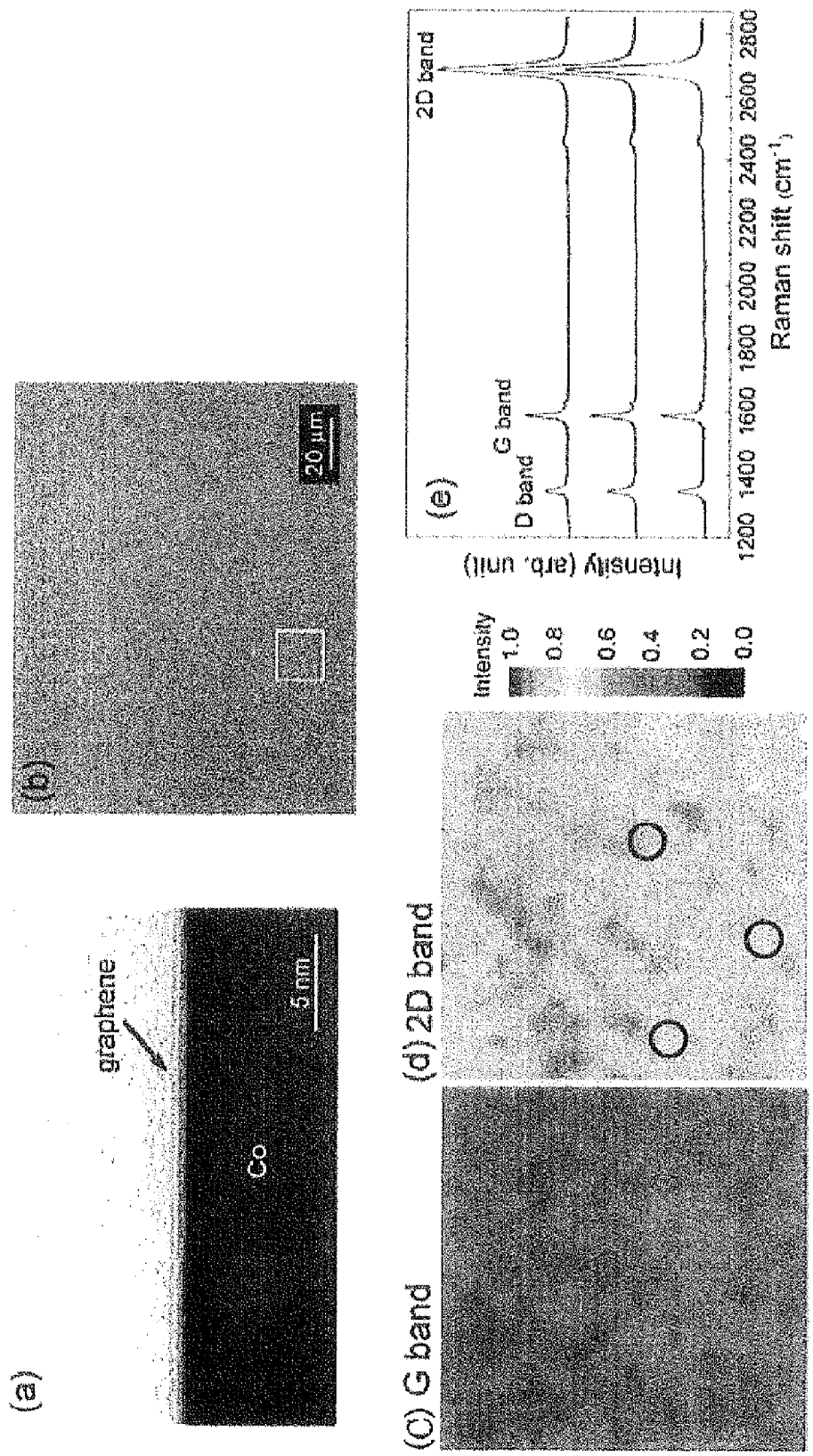
FIG. 30(a) shows a cross sectional TEM image of graphene that is synthesized on Co/c-plane sapphire at 1,000° C.
FIG. 30(b) shows an optical micrograph of graphene that is transferred to a silicon substrate (SiO$_2$ (300 nm)/Si)
FIG. 30(c) shows a Raman mapping image of the G band (approximately 1,585 cm$^{-1}$) of the graphene.
FIG. 30(d) shows a Raman mapping image of the 2D band (approximately 2,675 cm$^{-1}$) thereof (the mapping area measured in FIGS. 30(c) and (d) is the area surrounded by the square in FIG. 30(b))
FIG. 30(e) shows a Raman spectra of the areas marked in FIG. 30(d).

FIG. 30 shows the measurement results of the resulting graphene. FIG. 30(a) shows a cross sectional TEM image of the graphene synthesized with Co/c-plane sapphire at 1,000° C., FIG. 30(b) shows an optical micrograph of the graphene transferred to a silicon substrate (SiO$_2$ (300 nm)/Si), FIG. 30(c) shows a Raman mapping image of the G band (approximately 1,585 cm$^{-1}$) of the graphene, FIG. 30(d) shows a Raman mapping image of the 2D band (approximately 2,675 cm$^{-1}$) thereof (the mapping area measured in FIGS. 30(c) and (d) is the area surrounded by the square in FIG. 30(b)), and FIG. 30(e) shows a Raman spectrum of the areas marked in FIG. 30(d). Thus, uniform single layer graphene was grown, and in particular, the 2D band became sharper than in Example 1.

FIG. 31 shows the measurement results of LEED images. FIG. 31(a) shows a LEED image of Co/c-plane sapphire (beam energy: 180 eV), FIGS. 31(b) and (c) show LEED images of graphene/Co/c-plane sapphire ((b): grown at 900° C., (c): grown at 1,000° C., beam energy: 180 eV), FIG. 31(d) shows comparison of change in intensity of the (10), (11) and (12) diffraction spots of the samples grown at 900° C. and 1,000° C., FIGS. 31(e) and (f) show LEED images measured for the samples grown at 900° C. (e) and 1,000° C. (f) with the beam energy changed, and FIGS. 31(g) and (h) show relative orientation relationship of the Co atom and the graphene, which is derived from the LEED patterns ((f): grown at 900° C., (g): grown at 1000° C.). The measurements were performed in vacuum (8×10$^{-9}$ Pa or less) at 80 K.

In the LEED image of the Co/c-plane sapphire having been subjected only to hydrogen annealing but not to graphene growth, substantially no LEED image was observed (FIG. 31(a)). It was considered that this was because no periodical surface structure was present due to oxidation on the Co surface caused by exposure to the air. In the synthesis at 900° C. in Example 1, on the other hand, the LEED image showed six equally spaced sharp diffraction sports, which were considered to be derived from the Co lattice, and a broad ring diffraction pattern locally distributed to twelve spots, which was considered to be derived from the graphene. These correspond to the fact that the graphene with a large number of domains is present with rotation by 22° from the Co lattice (FIG. 31(g)).

Figure 34:
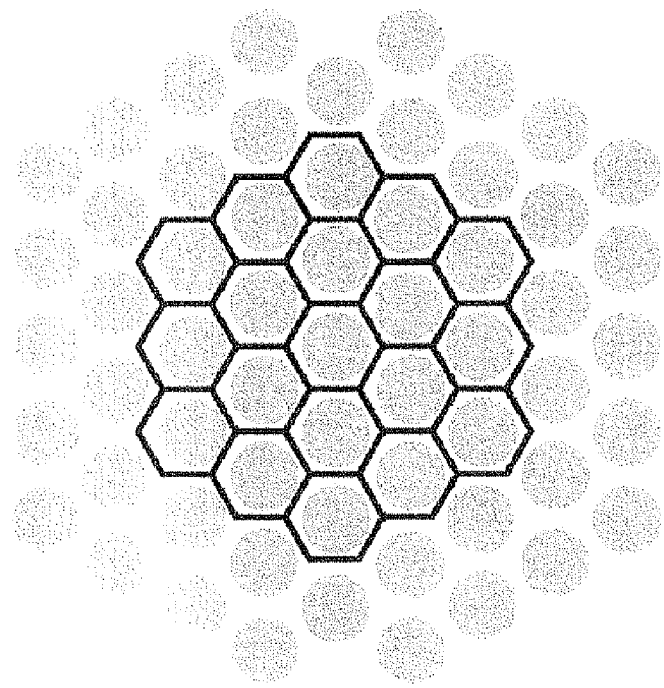
FIG. 34 shows an illustration schematically showing a structure of graphene on a metal catalyst as an underlayer, which is derived from a LEED image in synthesis at 1,000° C.

In the synthesis at 1,000° C. (FIG. 31(c)), on the other hand, six strong spots were observed without ring streak. While not shown in the figure, it was found by the analysis of the I-V curve that the six spots were derived from both the Co lattice and the graphene. It was understood from the results that in the synthesis at 1,000° C., the graphene better controlled in orientation was epitaxially grown on the Co fcc (111) plane with rotation by 0° from the Co lattice (FIG. 31(h) and FIG. 34).

Figure 35:
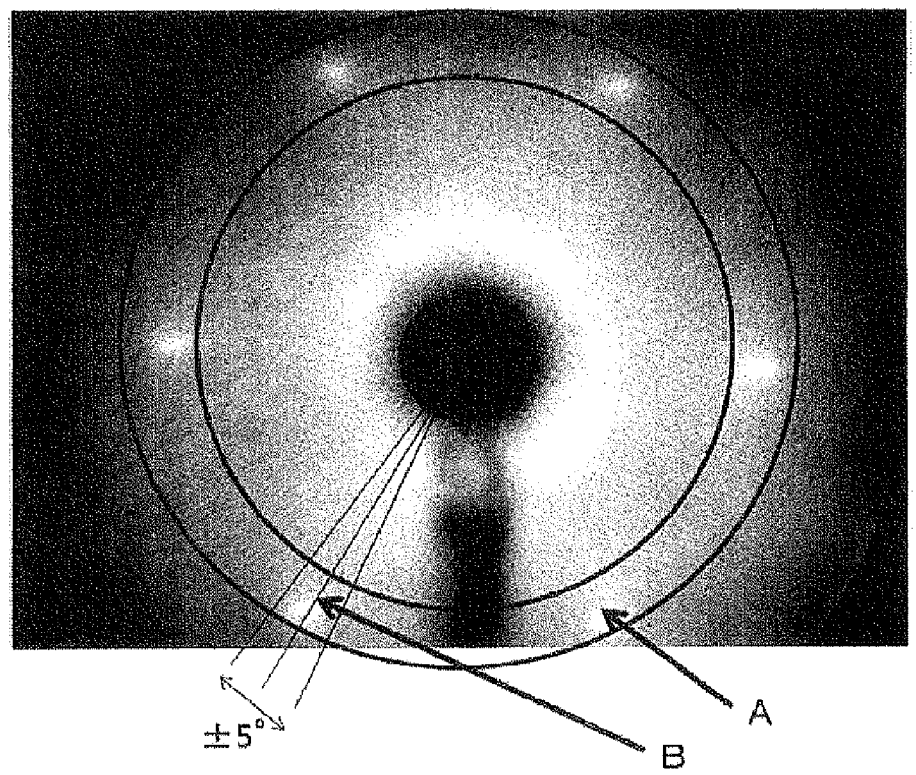
FIG. 35 shows an illustration describing the measurement method of an in-plane shear of the orientation of 6-membered rings.

The graphene obtained by the synthesis at 1,000° C. was measured for in-plane shear of the orientation of 6-membered rings in the following manner. The range ±5° will be described as an example, with reference to the measurement example at 100 eV shown in FIG. 35. The peak intensity in the range surrounded by two circles was integrated and designated as the integrated intensity A. The peak intensity in a range of ±5° from the peak was integrated and designated as the integrated intensity B. The value obtained by the expression (integrated intensity B)×6/(integrated intensity A)×100 was evaluated as the in-plane shear (%) of the orientation of 6-membered rings. As a result, the graphene obtained by the synthesis at 1,000° C. had 90% or more of domains having an in-plane shear of the orientation of 6-membered rings aligned within ±5°, and thus was well controlled in crystal orientation. Furthermore, the graphene obtained by the synthesis at 900° C. in Example 1 also had a distribution of an in-plane shear of the orientation of 6-membered ring of ±8°, and thus was controlled in crystal orientation. By using an electron energy of 100 eV, the intensity of the six spots in the LEED image was derived substantially only from the graphene, as shown by the arrow in FIG. 31(d), the aforementioned calculation was enabled. The in-plane shear of the orientation of 6-membered rings may also be measured after transferring the graphene on the metal film to another substrate.

There was such a tendency observed that the graphene synthesized at 1,000° C. had a larger ratio of single layer, as compared to Example 1 where the graphene was synthesized at 900° C. Specifically, in the synthesis at 900° C., the ratio of single layer was 70%, whereas in the synthesis at 1,000° C., the ratio of single layer was approximately from 80 to 90% while there was a fluctuation by samples.

Example 6

Figure 32:
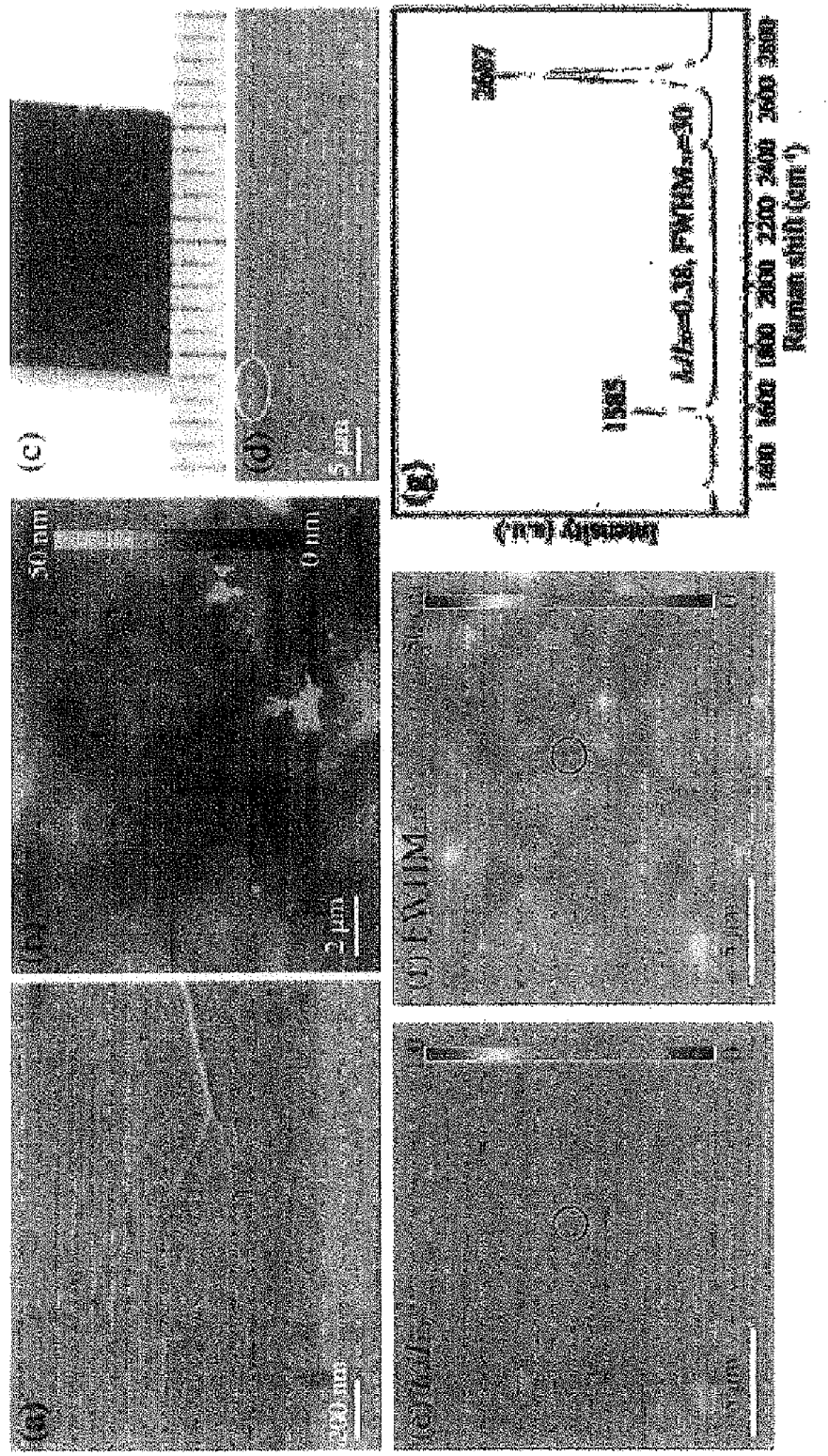
FIG. 32(a) shows an SEM image of graphene that is synthesized with Cu/c-plane sapphire at 1,000° C.
FIG. 32(b) shows an AFM image thereof.
FIG. 32(c) shows a photograph of the graphene that is transferred to a silicon substrate.
FIG. 32(d) shows an optical micrograph thereof (the area surrounded by the ellipsoid in FIG. 32(d) denotes the silicon substrate)
FIG. 32(e) shows a Raman mapping image of I$_G$/I$_{2D}$ of the graphene after transferring from the Cu/c-plane sapphire to the silicon substrate.
FIG. 32(f) shows half maximum (FWHM) of the 2D band of the Raman spectrum.
FIG. 32(g) shows a representative Raman spectrum of the spot surrounded by the circles in FIGS. 32(e) and (f).

Graphene was synthesized in the same manner as in Example 5 except that copper (Cu) was used as the metal film instead of Co in Example 5. FIGS. 32 and 33 show the results thereof. FIG. 32(a) shows an SEM image of graphene synthesized with Cu/c-plane sapphire at 1,000° C., FIG. 32(b) shows an AFM image thereof, FIG. 32(c) shows a photograph of the graphene transferred to a silicon substrate, FIG. 32(d) shows an optical micrograph thereof (the area surrounded by the ellipsoid in FIG. 32(d) denotes the silicon substrate), FIG. 32(e) shows a Raman mapping image of I$_G$/I$_{2D}$ of the graphene after transferring from the Cu/c-plane sapphire to the silicon substrate, FIG. 32(f) shows a Raman mapping image of a full width at half maximum (FWHM) of the 2D band, and FIG. 32(g) shows a representative Raman spectrum of the spot surrounded by the circle in FIGS. 32(e) and (f). FIG. 33 shows LEED images of graphene/Cu/c-plane sapphire ((a): grown at 900° C., (b): grown at 1,000° C., beam energy: 140 eV). The area surrounded by the circle in FIG. 33(a) is a diffraction spot of the Co lattice. The area surrounded by the circle in FIG. 33(b) is a diffraction spot of both the Co lattice and the graphene. FIG. 33(c) is an illustration describing the LEED images.

Uniform single layer graphene was grown, as similar to Example 5, and the graphene obtained by synthesis at 1,000° C. had 90% or more of domains having an in-plane shear of the orientation of 6-membered rings aligned within ±5°, and thus was well controlled in crystal orientation.

The rotation of the graphene lattice with respect to the Cu (111) lattice was 0° in the synthesis at 1,000° C. and was 30° in the synthesis at 900° C. Graphene was also grown by using Cu/SiO$_2$ (300 nm)/Si.

Example 7

Graphene was synthesized in the following manner.
1) Formation of Epitaxial Metal Film on Surface of Single Crystal Substrate by Sputtering A single crystal substrate of MgO using a (001) plane or a (111) plane was cut into an approximately 10 mm square, and the single crystal substrate was disposed in a chamber of an RF magnetron sputtering equipment, and under heating to a temperature of from 300 to 400° C., Co metal was sputtered on the surface of the single crystal substrate.

According to the procedures, a Co film having a thickness of 50 nm was formed. For comparison, a single crystal substrate remaining at room temperature was subjected to sputtering.

2) Synthesis of Graphene Sheet and Metal Film after Heat Treatment

Polystyrene was spin coated on the Co film and then heated in vacuum. While the substrate was maintained in vacuum of approximately $10^{-4}$ Pa, the substrate was heated to 900° C. in 5 minutes, maintained for 30 minutes, and then cooled to room temperature. An infrared gold image furnace was used for heating, and cooling was performed at a sufficient rate.

The properties of the substrate surface after the heat treatment are shown in FIGS. 36 and 37. FIG. 36(a) shows an optical micrograph of pits formed on the surface of the Co film having polystyrene coated thereon, and FIG. 36(b) shows an SEM image thereof. FIG. 37(a) shows an AFM image of the pits formed on the surface of the Co film, and FIG. 37(b) shows a height profile thereof. It was understood from FIG. 37 that holes were formed on the surface of the Co film, and the Co metal in the circumference thereof was protruded.

Figure 38:
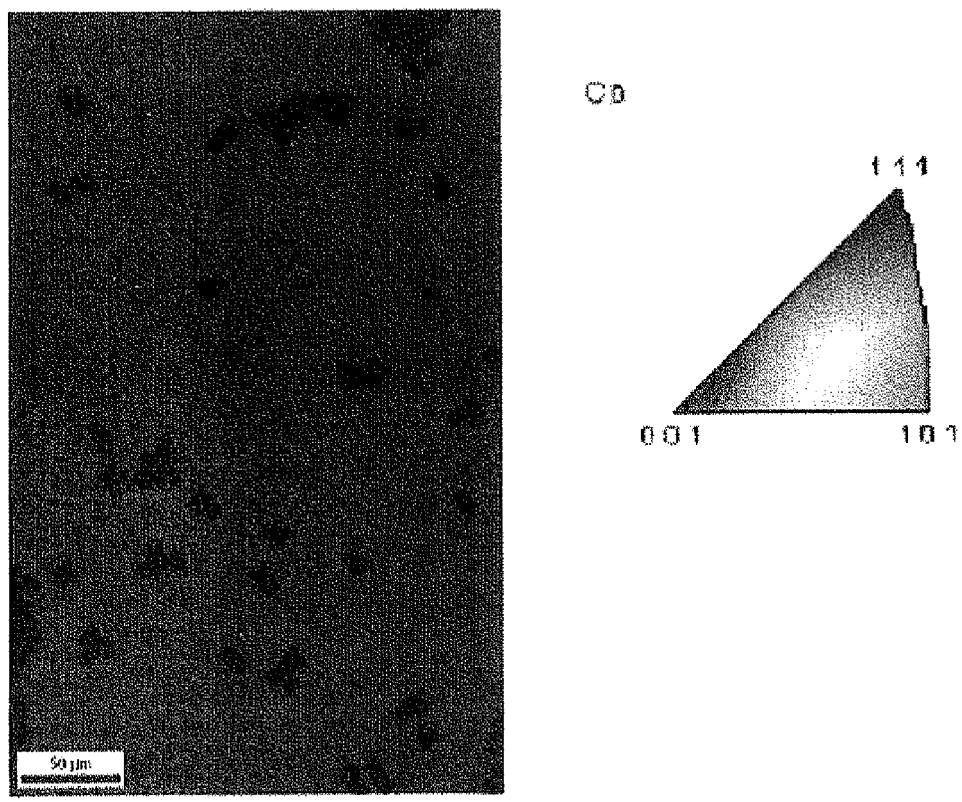
FIG. 38 shows a measurement result of EBSD of the Co film surface having polystyrene coated and then thermally decomposed.

The fact that the Co film having polystyrene coated and thermally decomposed thereon was close to single crystal was clarified from the EBSD (electron back scatter diffraction pattern) shown in FIG. 38, and the XRD while the details thereof were omitted herein. In the EBSD shown in FIG. 38, it was understood that the entire surface of the substrate is red and from the triangle on the right that the (001) plane was directed upward. Thus, the entire crystal was directed to the (001) direction, and the detailed analysis revealed that the orientation was aligned in the in-plane direction.

3) Graphene Sheet

The graphene sheet formed on the surface of the Co film having polystyrene coated and thermally decomposed thereon was analyzed. For analyzing graphene, Raman spectroscopy is mainly employed. In Raman spectroscopy, a G band appearing at approximately 1,583 $cm^{-1}$ derived from a graphite structure, a 2D band appearing at approximately 2,700 $cm^{-1}$, and a D band appearing at approximately 1,350 $cm^{-1}$ derived from defects are representative. For reference, FIG. 39 shows Raman spectra of single layer graphene (a) and two-layer graphene (b).

The thickness of graphene are often estimated from the 2D/G peak ratio and the position and shape of the 2D band. For example, it is considered that single layer graphene is formed when 2D/G is 1 or more, two-layer graphene is formed when it is approximately 1, and three or more-layer graphene is formed when it is less than 1.

For measuring the spatial spread of graphene, two-dimensional mapping is effective, in which Raman scattering is measured with a sample placed on a stage being moved. A sample having rectangular pits formed as shown in FIGS. 36 and 37 was subjected to Raman mapping. The results are shown in FIG. 40. FIG. 40(a) shows the intensity of the G band, and FIG. 40(b) shows the intensity of the 2D band. FIG. 40(c) shows an optical micrograph of the corresponding view field, and FIG. 40(d) shows a representative Raman spectrum.

It was understood from FIG. 40 that the graphene sheet was formed dominantly in the pits. The pits had a size of from 5 to 10 µm, and grew to 20 µm at maximum. The size and the density thereof can be controlled by the thickness of the polymer (polystyrene), the thickness of Co, and the heat treatment temperature and time.

It was estimated from FIG. 40 that the graphene sheet thus formed in the pits had approximately 2 to 5 layers. While the details are omitted, data suggesting two-layer or thicker ones are often obtained in the test performed by the inventors. However, the thickness depends on the thickness of the polymer (polystyrene), and single layer graphene may be synthesized by thinning the polystyrene.

Rectangular pits are formed on an MgO (001) plane, but triangular pits appear on a Co film on an MgO (001) plane. The results are shown in FIG. 41. FIG. 41(a) shows the intensity distribution of the G band, and FIG. 41(b) shows the intensity distribution of the 2D band. FIG. 41(c) shows an optical micrograph of the corresponding view field.

4) Patterning

The pits may be formed in theory by patterning a substrate by electron beam lithography or the like, and then subjecting the substrate to chemical etching with HCl, dry etching by RIE, or by direct drawing by FIB. One example thereof is shown in FIG. 42, which is an optical micrograph showing an example where pits are formed at designated positions by electron beam lithography and chemical etching (the positions surrounded by the circles are patterned positions).

4) Transferring

Figure 43:
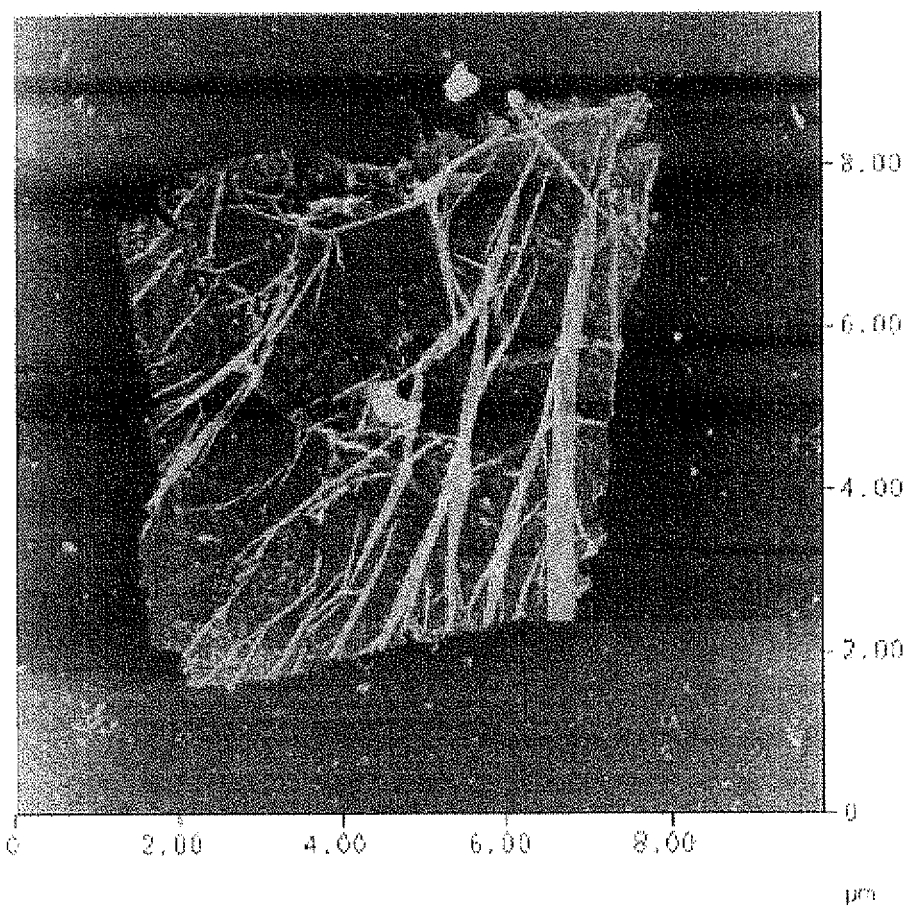
FIG. 43 shows an AFM image of a rectangular graphene sheet that is transferred to a silicon substrate.

The graphene sheet formed in the rectangular or triangular pits can be transferred to an $SiO_2$/Si substrate, a flexible substrate or the like by dissolving Co. FIG. 43 shows an AFM image where graphene/Co/MgO (001) substrate was immersed in hydrochloric acid for dissolving Co, and then the graphene sheet was skimmed with a silicon substrate. It was understood from the image that the graphene was formed in the pits, and the shape thereof agreed with the shape of the pits. The graphene enables production of a transistor with a bottom gate structure, or a top gate structure or a double gate structure by accumulation of an insulating film.

The graphene sheet thus transferred had a height of 1 nm and thus was confirmed to be graphene with several layers. This also agreed with the measurement results of Raman spectroscopy (the data thereof are not shown herein).

Example 8

A (001) plane of an MgO single crystal substrate with Ni metal instead of Co metal in Example 7 was subjected to sputtering. According to the procedures, an Ni film having a thickness of 50 nm was formed thereon. Polystyrene was spin coated on the Ni film, and subjected to a heat treatment in vacuum as similar to Example 7.

Figure 44:
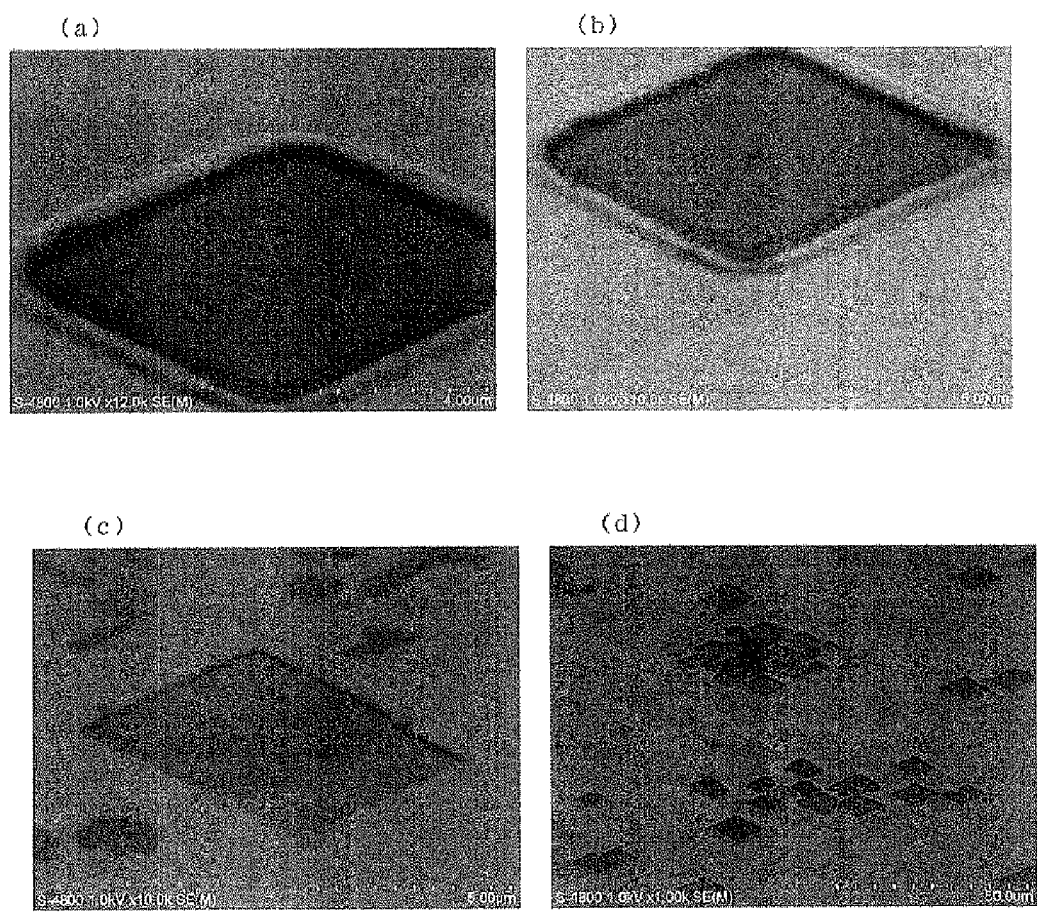
FIG. 44 shows SEM images of a substrate surface of an Ni/MgO substrate after polystyrene coating and thermal treatment.
Figure 46:
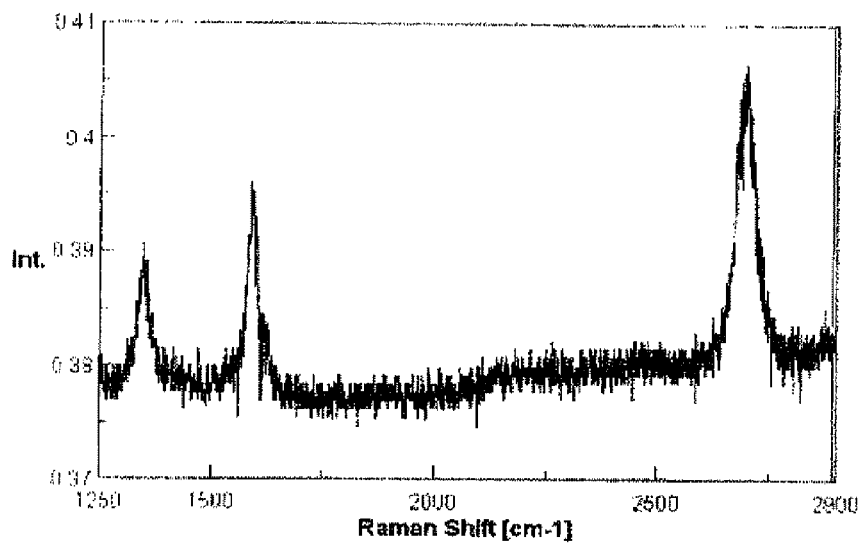
FIG. 46 shows a representative Raman spectrum of FIG. 45.

FIGS. 44 (a) to (d) show SEM images of the surface of the substrate after the heat treatment. FIG. 45(a) shows the intensity distribution of the G band, and FIG. 45(b) shows the intensity distribution of the 2D band. FIG. 46 shows a representative Raman spectrum. In the case where Ni metal was used, a graphene sheet was also formed in the rectangular pits, as similar to Example 7

Example 9

Co metal was sputtered on a c-plane or an a-plane of an $\alpha$-$Al_2O_3$ single crystal substrate instead of the MgO single crystal substrate in Example 1. According to the procedures, a Co film having a thickness of 50 nm was formed thereon. Polystyrene was spin coated on the Co film, and subjected to a heat treatment in vacuum as similar to Example 1.

The same test was performed with Ni metal instead of Co metal.

Figure 47:
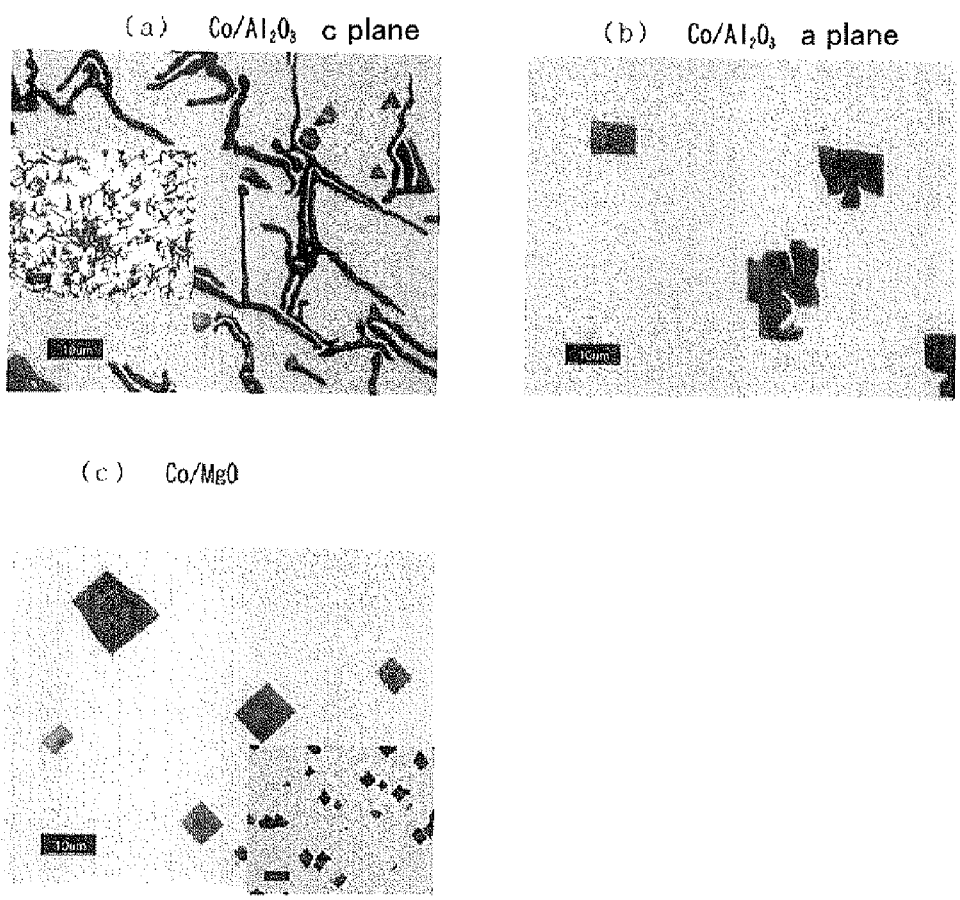
FIG. 47(a) shows an optical micrograph of pits formed on a surface of a Co film having polystyrene coated thereon in the case where Co metal is sputtered on a c-plane of an $\alpha$-$Al_2O_3$ single crystal substrate.
FIG. 47(b) shows a similar optical micrograph in the case where Co metal is sputtered on an a-plane of an $\alpha$-$Al_2O_3$ single crystal substrate.
FIG. 47(c) shows a similar optical micrograph in the case where Co metal is sputtered on an Mg(100) single crystal substrate.
Figure 48:
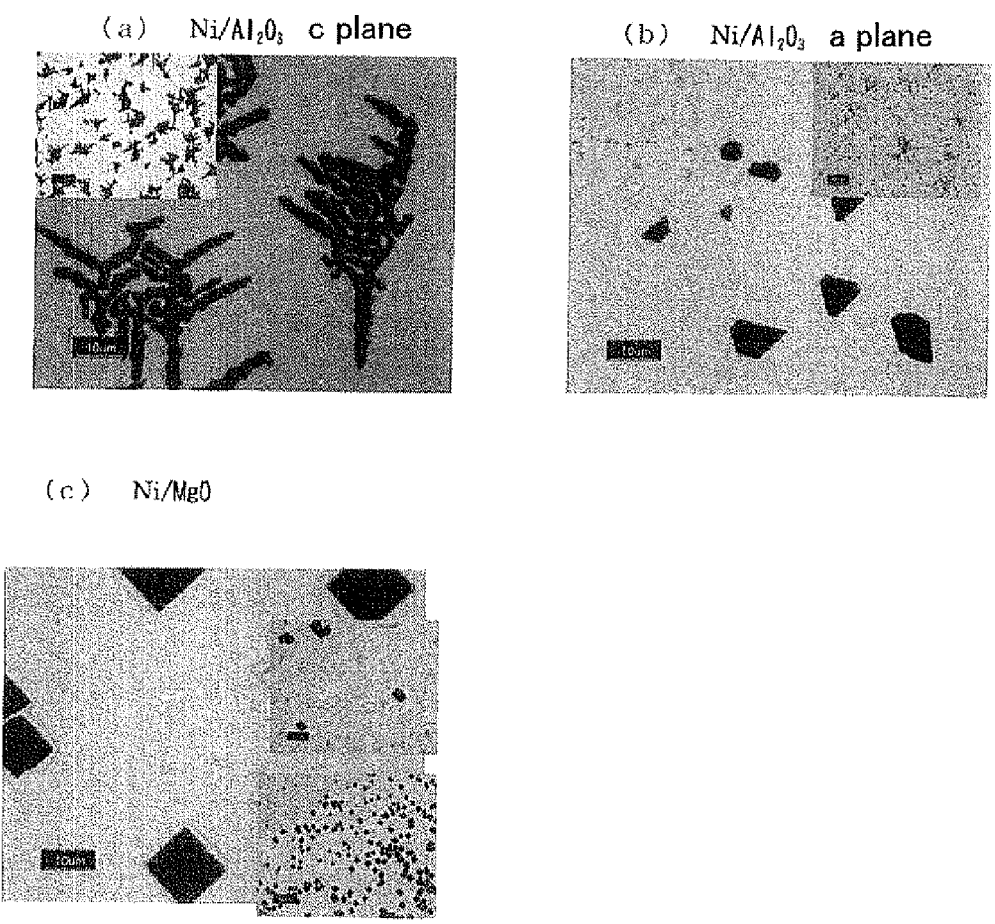
FIG. 48(a) shows an optical micrograph of pits formed on a surface of an Ni film having polystyrene coated thereon in the case where Ni metal is sputtered on a c-plane of an $\alpha$-$Al_2O_3$ single crystal substrate.
FIG. 48(b) shows a similar optical micrograph in the case where Ni metal is sputtered on an a-plane of an $\alpha$-$Al_2O_3$ single crystal substrate.
FIG. 48(c) shows a similar optical micrograph in the case where Ni metal is sputtered on an MgO single crystal substrate.

FIG. 47(a) shows an optical micrograph of pits formed on the surface of the Co film having polystyrene coated thereon in the case where Co metal is sputtered on the c-plane of the $\alpha$-$Al_2O_3$ single crystal substrate, and FIG. 47(b) shows a similar optical micrograph in the case where Co metal is sputtered on the a-plane of the $\alpha$-$Al_2O_3$ single crystal substrate. FIG. 47(c) shows a similar optical micrograph in the case where Co metal is sputtered on an MgO single crystal substrate as similar to Example 1. FIGS. 48(a) to (c) are similar optical micrographs as in FIG. 47 where Ni metal is used. FIG. 49 shows SEM images thereof in synthesis at 900° C.

In the case where an $\alpha\text{-}Al_2O_3$ single crystal substrate was used, a graphene sheet was also formed in the pits as similar to Example 1.

The test was performed under the same conditions as in Example 1 except that the heat treatment temperature after coating polystyrene was changed to a range of from 500 to 1,000° C., and single crystal substrates (MgO and $\alpha\text{-}Al_2O_3$) and metal films (Co and Ni) were used. A graphene sheet was formed under the conditions, and in most cases, graphene was formed selectively in the pits.

The most of the shapes of the graphene formed in the pits had a triangular, rectangular, hexagonal, octagonal or circular planar shape, or a planar shape having an edge with a zigzag structure or an armchair structure as shown in FIGS. 47(a) and 48(a) and the lower column of FIG. 49.

The invention claimed is:

1. A graphene sheet comprising a large number of graphene domains, the domains each having an area of from 0.000001 $\mu m^2$ to 100,000 $mm^2$, orientations of 6-membered rings in the domains being averagely aligned in a single direction over the graphene sheet.

2. The graphene sheet according to claim 1, wherein an in-plane mis-orientation of 6-membered rings is such that 90% or more of the domains have orientations aligned within ±5° or less.

3. The graphene sheet according to claim 1, wherein an in-plane mis-orientation of 6-membered rings is such that 90% or more of the domains have orientations aligned within ±10° or less.

4. The graphene sheet according to claim 1, wherein the graphene sheet containing a large number of domains has an overall size of from 1 $mm^2$ to 50,000 $mm^2$.

5. The graphene sheet according to claim 1, wherein a proportion of graphene that has the same number of layers is 90% or more.

6. The graphene sheet according to claim 5, wherein a proportion of single layer graphene is 90% or more.

7. The graphene sheet according to claim 1, wherein a proportion of single layer graphene is 50% or more.

8. The graphene sheet according to claim 1, wherein a proportion of two-layer graphene is 50% or more.

9. The graphene sheet according to claim 1, wherein a proportion of three-layer graphene is 50% or more.

10. A composite of a graphene sheet comprising the graphene sheet according to claim 1 that is transferred to a substrate, and having a size of from 10 $nm^2$ to 1 $m^2$.

11. A composite of a graphene sheet comprising a metal film, and the graphene sheet according to claim 1 that is grown on a surface of the metal film.

12. A composite of a graphene sheet comprising a single crystal substrate, an epitaxial metal film that is formed on the single crystal substrate, and the graphene sheet according to claim 1 that is grown on a surface of the metal film.

13. The composite of a graphene sheet according to claim 11, wherein a LEED (low energy electron diffraction) image of the composite containing the graphene sheet has six equally spaced diffraction spots.

14. The composite of a graphene sheet according to claim 11, wherein a LEED image of the composite containing the graphene sheet has six equally spaced diffraction spots and a ring diffraction pattern having intensity that is locally distributed around the center of spots.

15. The composite of a graphene sheet according to claim 11, wherein a LEED image of the composite containing the graphene sheet has six equally spaced diffraction spots and a ring diffraction pattern that is locally distributed to twelve spots.

16. A method for producing a graphene sheet, comprising a step of growing a graphene sheet by making a carbon material contact with a surface of an epitaxial metal film that is formed on a surface of a single crystal substrate selected from the group consisting of sapphire, magnesium dioxide, quartz, lanthanium aluminate and titanium dioxide,
wherein:
the graphene sheet consists of graphene domains,
the domains each have an area from 0.000001 $\mu m^2$ to 100,000 $mm^2$, and
orientations of 6-membered rings in the domains are averagely aligned in a single direction over the graphene sheet.

17. The method for producing a graphene sheet according to claim 16, wherein the epitaxial metal film is formed by sputtering at a high temperature or with a warmed substrate and is oriented in the direction of the single crystal substrate.

18. The method for producing a graphene sheet according to claim 16, wherein the single crystal substrate is selected from the group consisting of a c-plane (0001) of sapphire, an a-plane (11-20) of sapphire, an r-plane (1-102) of sapphire, a (100) plane of magnesium dioxide, a (110) plane of magnesium dioxide, and a (111) plane of magnesium dioxide.

19. The method for producing a graphene sheet according to claim 16, wherein a LEED (low energy electron diffraction) image of the graphene sheet and a composite containing the metal film have six equally spaced diffraction spots.

20. The method for producing a graphene sheet according to claim 16, wherein a LEED image of the substrate having the graphene sheet formed thereon has six equally spaced diffraction spots and a ring diffraction pattern having intensity that is locally distributed around the center of spots.

21. The method for producing a graphene sheet according to claim 16, wherein a LEED image of the substrate having the graphene sheet formed thereon has a ring diffraction pattern that is locally distributed to twelve spots.

22. The method for producing a graphene sheet according to claim 16, wherein the graphene sheet is grown on the epitaxial metal film by chemical vapor deposition (CVD) under a pressure of from the atmospheric pressure to a reduced pressure by feeding carbon-containing molecules in a gaseous state.

23. The method for producing a graphene sheet according to claim 16, wherein the substrate is subjected to hydrogen annealing at a temperature lower than a temperature upon synthesis of the graphene sheet, before synthesis of the graphene sheet.

24. The method for producing a graphene sheet according to claim 16, wherein an organic polymer film is formed on the surface of the epitaxial metal film, and then the organic polymer is thermally decomposed in vacuum, thereby growing the graphene sheet.

25. The method for producing a graphene sheet according to claim 16, wherein the graphene sheet is grown on the surface of the epitaxial metal film, and then the graphene sheet is separated therefrom by an acid treatment or a method utilizing a difference in reduction potential of transition metals.

* * * * *